(12) United States Patent
Browning et al.

(10) Patent No.: US 11,059,375 B2
(45) Date of Patent: *Jul. 13, 2021

(54) ROBOTS AND APPARATUS, SYSTEMS AND METHODS FOR POWERING ROBOTS

(71) Applicant: Intel Corporation, Santa Clara, CA (US)

(72) Inventors: David W. Browning, Beaverton, OR (US); Yoshifumi Nishi, Beaverton, OR (US); Mark MacDonald, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,287

(22) Filed: Aug. 12, 2019

(65) Prior Publication Data

US 2020/0031245 A1   Jan. 30, 2020

Related U.S. Application Data

(63) Continuation of application No. 15/394,431, filed on Dec. 29, 2016, now Pat. No. 10,377,252.

(51) Int. Cl.
*G05B 19/04* (2006.01)
*B60L 53/14* (2019.01)
(Continued)

(52) U.S. Cl.
CPC ............... *B60L 53/14* (2019.02); *B60L 5/38* (2013.01); *B60L 5/42* (2013.01); *B60L 50/53* (2019.02);
(Continued)

(58) Field of Classification Search
CPC ............ B60L 2200/30; B60L 2200/40; B60L 2260/32; B60L 50/53; B60L 53/14;
(Continued)

(56) References Cited

U.S. PATENT DOCUMENTS 1,779,052 A * 10/1930 Souplis ................. B60M 7/006
191/13
2,717,557 A * 9/1955 Seyffer .................. A63H 18/16
104/301
(Continued)

FOREIGN PATENT DOCUMENTS

EP         1526626 A2     4/2005

OTHER PUBLICATIONS

Open Dots Alliance, "Open Dots Technology Specification," Revision 1.2, May 3, 2016, retrieved on Feb. 9, 2017, [http://opendotsalliance.org/wp-content/uploads/2014/10/OpenDotsSpecifications1dot2.pdf], 8 pages.
(Continued)

*Primary Examiner* — Harry Y Oh
(74) *Attorney, Agent, or Firm* — Hanley, Flight & Zimmerman, LLC

(57) ABSTRACT

Robots and apparatus, systems and methods for powering robots are disclosed. A disclosed conductive floor to power a robot on the floor includes a plurality of stationary conductors positioned in a pattern and a power delivery circuit to cause adjacent ones of the conductors to have different electrical potentials, the adjacent ones of the conductors to form a circuit to deliver power to the robot via contacts formed in a bottom surface of the robot.

19 Claims, 13 Drawing Sheets

(51) Int. Cl.
  *H02K 11/33* (2016.01)
  *H02K 11/21* (2016.01)
  *B60L 5/38* (2006.01)
  *B60L 5/42* (2006.01)
  *B60L 50/53* (2019.01)
  *B60L 53/36* (2019.01)

(52) U.S. Cl.
  CPC .............. *B60L 53/36* (2019.02); *H02K 11/21* (2016.01); *H02K 11/33* (2016.01); *B60L 2200/30* (2013.01); *B60L 2200/40* (2013.01); *B60L 2260/32* (2013.01); *Y02T 10/64* (2013.01); *Y02T 10/70* (2013.01); *Y10S 901/01* (2013.01)

(58) Field of Classification Search
  CPC ... B60L 53/36; B60L 5/38; B60L 5/42; H02K 11/21; H02K 11/33; Y10S 901/01; Y02P 90/60; Y02T 10/64; Y02T 10/641; Y02T 10/70; Y02T 10/7005; Y02T 10/7072; Y02T 90/12; Y02T 90/14
  See application file for complete search history.

(56) References Cited

U.S. PATENT DOCUMENTS

| | | | | |
|---|---|---|---|---|
| 3,205,618 | A * | 9/1965 | Heytow | A63H 18/16 |
| | | | | 446/455 |
| 3,885,502 | A * | 5/1975 | Sarno | A63G 25/00 |
| | | | | 104/53 |
| 4,324,301 | A * | 4/1982 | Eyerly | A63G 25/00 |
| | | | | 104/53 |
| 5,868,076 | A * | 2/1999 | Myus | A63H 18/16 |
| | | | | 104/60 |
| 6,581,350 | B2 | 6/2003 | Dean | |
| 7,227,334 | B2 | 6/2007 | Yang et al. | |
| 7,430,462 | B2 | 9/2008 | Chiu et al. | |
| 7,607,500 | B2 | 10/2009 | Sweringen et al. | |
| 7,928,602 | B2 | 4/2011 | Heidmann | |
| 8,863,872 | B2 | 10/2014 | Gorgas et al. | |
| 9,712,000 | B2 * | 7/2017 | Akuzawa | H02J 50/12 |
| 10,377,252 | B2 | 8/2019 | Browning et al. | |
| 2002/0124512 | A1 * | 9/2002 | Dean | A63G 25/00 |
| | | | | 52/506.01 |
| 2005/0083011 | A1 | 4/2005 | Yang et al. | |
| 2006/0085105 | A1 | 4/2006 | Chiu et al. | |
| 2007/0209851 | A1 * | 9/2007 | Sweringen | A63G 25/00 |
| | | | | 180/65.51 |
| 2008/0238216 | A1 * | 10/2008 | Heidmann | E04F 15/02 |
| | | | | 307/145 |
| 2010/0141369 | A1 * | 6/2010 | Mori | H01F 38/14 |
| | | | | 336/200 |
| 2010/0147609 | A1 | 6/2010 | Gorgas et al. | |
| 2011/0186368 | A1 * | 8/2011 | Ueno | H02J 7/025 |
| | | | | 180/65.31 |
| 2013/0005418 | A1 * | 1/2013 | Ishida | B60L 58/22 |
| | | | | 463/6 |
| 2016/0068172 | A1 * | 3/2016 | Hourtane | B61L 3/008 |
| | | | | 701/19 |
| 2016/0197520 | A1 * | 7/2016 | Akuzawa | H02J 7/025 |
| | | | | 307/104 |
| 2018/0141452 | A1 * | 5/2018 | Hourtane | B60L 53/32 |
| 2018/0185998 | A1 | 7/2018 | Browning et al. | |
| 2018/0304752 | A1 * | 10/2018 | Duprat | B60L 53/36 |

OTHER PUBLICATIONS

International Searching Authority, "International Search Report," issued in connection with International Application No. PCT/US2017/060423, dated Feb. 19, 2018 (3 pages).

International Searching Authority, "Written Opinion," issued in connection with International Application No. PCT/US2017/060423, dated Feb. 19, 2018 (13 pages).

United States Patent and Trademark Office, "Restriction Requirement," dated Apr. 9, 2018 in connection with U.S. Appl. No. 15/394,431 (7 pages).

United States Patent and Trademark Office, "Non-Final Office Action," dated Sep. 20, 2018 in connection with U.S. Appl. No. 15/394,431 (11 pages).

United States Patent and Trademark Office, "Notice of Allowance," dated Apr. 3, 2019 in connection with U.S. Appl. No. 15/394,431 (5 pages).

United States Patent and Trademark Office, "Notice of Allowability," dated May 20, 2019 in connection with U.S. Appl. No. 15/394,431 (2 pages).

* cited by examiner

ROBOTS AND APPARATUS, SYSTEMS AND METHODS FOR POWERING ROBOTS

RELATED APPLICATION

This patent arises from a continuation of U.S. patent application Ser. No. 15/394,431, filed on Dec. 29, 2016, now U.S. Pat. No. 10,377,252, and entitled "ROBOTS AND APPARATUS, SYSTEMS AND METHODS FOR POWERING ROBOTS." U.S. patent application Ser. No. 15/394,431 is hereby incorporated by reference in its entity. Priority to U.S. patent application Ser. No. 15/394,431 is hereby claimed.

FIELD OF THE DISCLOSURE

This disclosure relates to power delivery systems and, more particularly, to robots and apparatus, systems and methods for powering robots.

BACKGROUND

Machinery and robots require power (e.g., electric, pneumatic, hydraulic, etc.) to operate. Motor-operated robots, whether stationary robots operating at a fixed location or mobile robots operating along a fixed path (e.g., a track or guide rail), typically receive power through power cables coupled to the robot's motor via a cable management system designed to position the power cables so as to not interfere with a robot work envelope (e.g., rotational and/or translational movement of the robot and/or robot end effector(s)). For example, an industrial mobile robot may be mounted on a carriage including roller guides permitting movement along floor-mounted, ceiling-mounted, or wall-mounted tracks. The robot may then be driven along the tracks by a motor-operated drive unit.

Figure 1:
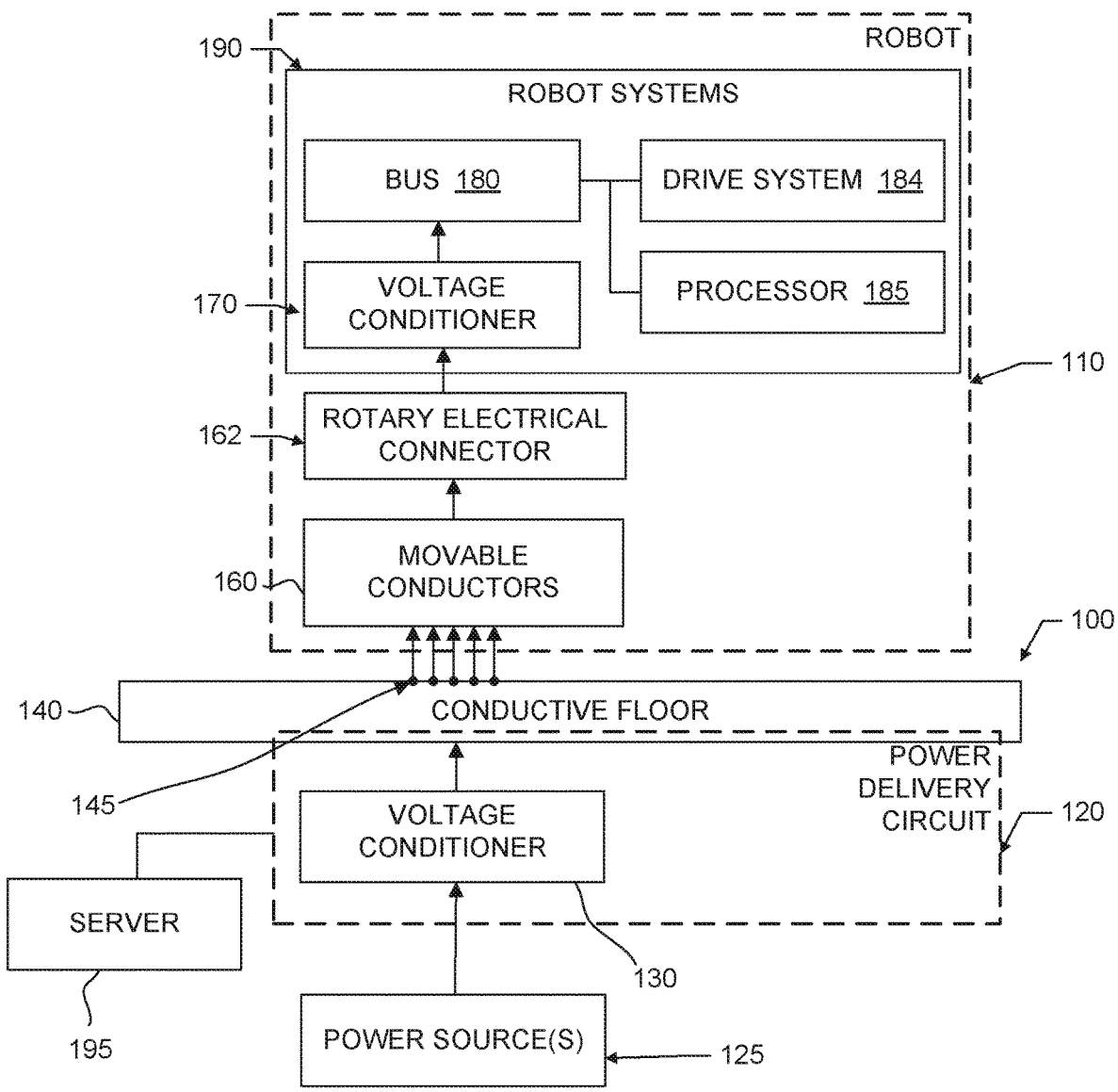
FIG. 1 is a block diagram of an example power delivery system constructed in accordance with some teachings of this disclosure to power a robot and/or other equipment or machines.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part indicates that there is no intermediate part between the two parts.

DETAILED DESCRIPTION

Some motor-operated mobile robots carry their own portable power supplies (e.g., batteries, gas engines, propane engines, hydrogen fuel cells, etc.). While enhancing degrees-of-freedom of movement, portable power supplies introduce other design and operational constraints. For example, the weight of the portable power supply can exacerbate the capacity limitations (e.g., a short battery life, etc.) affecting in-service availability.

In some examples disclosed herein, a power system supplies power to a robot or machine via a conductive floor. In some examples, the power system may implement one or more aspects of Open Dots, an industry standard specification (Open Dots Technology Specification, Maintained by Open Dots Alliance, Rev. 2, publ. May 3, 2016) for conductive wireless power technology.

In some examples, the conductive floor includes a plurality of stationary conductors positioned in a pattern and a power delivery circuit to cause adjacent ones of the conductors to have different electrical potentials. The adjacent ones of the conductors selectively form a circuit to deliver power to the robot or other machines via contacts formed in a bottom surface of the robot or other machines. In some examples, contacts are disposed along a tread of an ambulatory robot to obtain power for the motor and/or other systems of the robot by forming circuits with the conductors positioned on the surface (e.g., floor, etc.) along which the tread moves.

FIG. 1 is a block diagram of an example power delivery system 100 to supply power to an example robot 110. Although a robot 110 with free mobility (i.e., a robot not constrained to tracks but instead allowed to freely roam throughout a space) is shown in the example of FIG. 1, the example system 100 of FIG. 1 could also be used to deliver power to stationary machines. The example system 100 of FIG. 1 includes a floor 140 and an example power delivery circuit 120. The example power delivery circuit 120 receives power from one or more example power source(s) 125. In the illustrated example, the power is delivered via an electrical voltage. The power delivery circuit 120 of this example conditions the voltage via an example voltage conditioner 130. The voltage conditioner 130 may, for example, step the voltage up or down to a desired level, convert the voltage from AC to DC, etc. The conditioned voltage is output to the conductive floor 140. The example floor 140 includes charging contacts 145 to provide power to the example robot 110. In some examples, the charging contacts 145 include a plurality of stationary conductors positioned in a pattern in the conductive floor 140. The power delivery circuit 120 causes adjacent ones of the conductors to have different electrical potentials. The adjacent ones of the conductors may form a circuit to deliver power to the robot and/or other equipment via contacts formed in a bottom surface of the robot and/or other equipment.

The robot 110 of this example includes movable conductors 160 in selective contact with the floor 140. The movable conductors 160 are connected, via a rotary electrical connector 162 to a voltage conditioner 170. When the movable conductors 160 contact the charging contacts 145, a circuit is closed to deliver power to the voltage conditioner 170 through the rotary electrical connector 162. In some examples, the rotary electrical connector 162 provides an electrical conduction path between the movable conductors 160 on a movable element of the robot (e.g., a wheel, a spherical wheel or omnidirectional ball, etc.) and a stationary element of the robot (e.g., a voltage conditioner, a bus, an axle, a support member, etc.). In some examples, the rotary electrical connector 162 includes a slip ring, a brushless slip ring, a rotary electrical joint, an electric swivel and/or any electromechanical device enabling intermittent or continuous rotation while transmitting power and/or signals.

The power received from the example movable conductors 160 is conditioned (e.g., stepped up, stepped down, etc.) by the example voltage conditioner 170 and passed, via an example bus 180, to various example robot systems 190, such as a drive system and/or a processor. The robot 110 and the power delivery circuit 120 are discussed in more detail below in relation to FIGS. 2-3. In some examples, the robot 110 is ambulatory and the contacts 160 of the robot 110 are disposed in contact surfaces that move to propel the robot across the conductive floor 140 (e.g., contacts disposed on a wheel or wheels, contacts disposed on bottom surfaces of feet of a multi-legged robot (e.g., bipedal, multi-pedal, etc.)). In some examples, the robot is stationary and/or the robot is replaced by non-robotic equipment (e.g., medical equipment, factory equipment, etc.) with stationary contacts on its undersurface (e.g., feet, legs, a stand, etc.) or with movable contacts on wheels or casters or the like supporting the non-robotic equipment on the floor. The stationary robotic and/or non-robotic equipment can be moved to many (e.g., any) places on the floor 140 and can still be powered via the floor 140 without a separate plug into, for example, a wall power socket.

In some examples, a server 195 controls the power delivery circuit 120 to control an ambulatory robot on the conductive floor by setting different voltages in different regions of the floor and/or sending broadcast modulated signals through the floor. To this end, the conductive floor 140 and the power delivery circuit include multiple, separately addressable circuit paths so that different regions of the floor may be maintained at different voltage levels and/or may receive one or more modulated signals not present in other regions of the floor.

Figure 2:
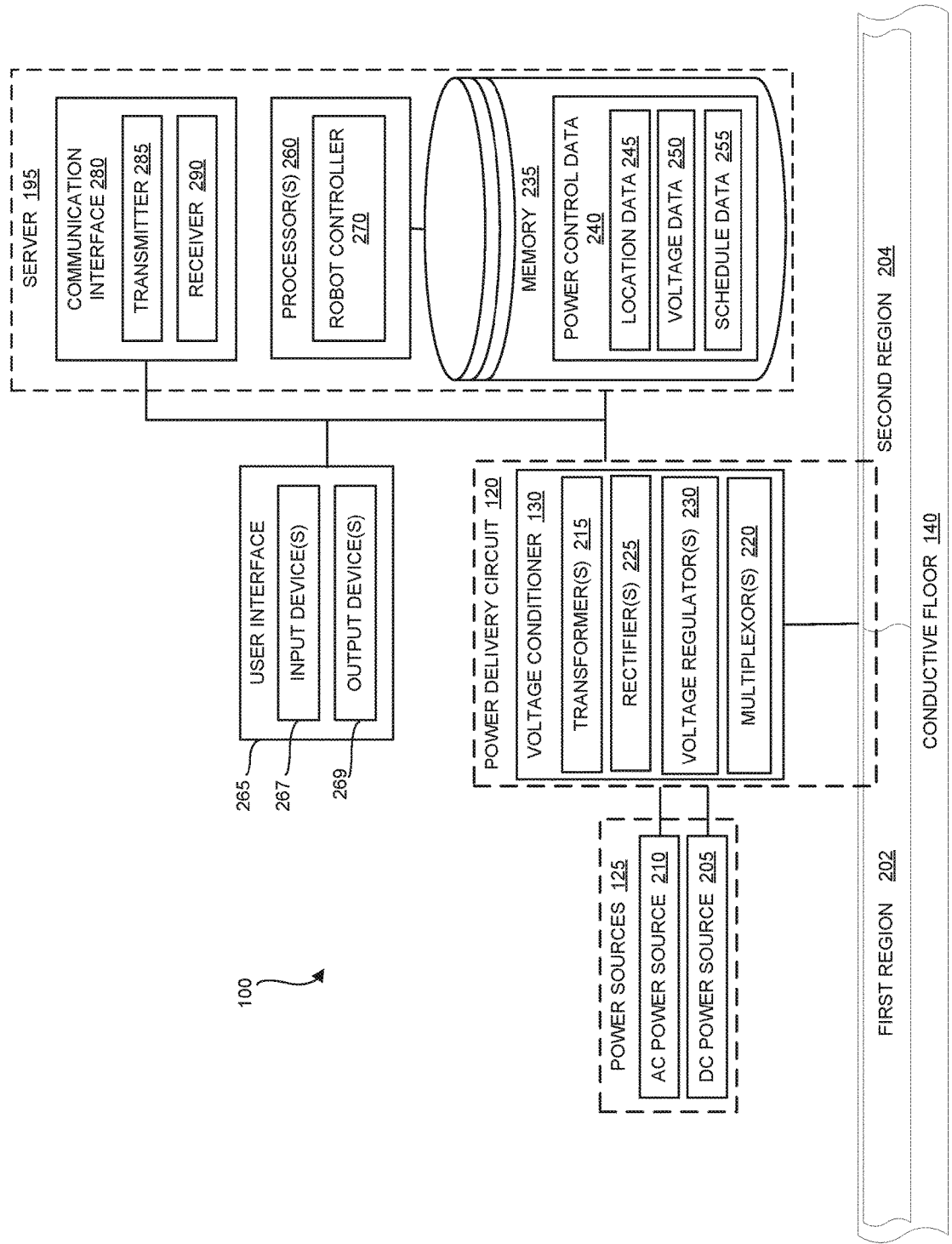
FIG. 2 is a block diagram of an example implementation of the power delivery system of FIG. 1.

FIG. 2 is a block diagram of an example implementation of the power delivery system 100 of FIG. 1. FIG. 2 shows the example conductive floor 140 to include an example first region 202 and an example second region 204. In this example, the first region 202 and the second region 204 are electrically isolated from one another and, thus, may be maintained at the same voltage or a different voltage. The power delivery circuit 120 is to cause a first set of the conductors 145 in a first region 202 of the floor to exhibit a first voltage and a second set of the conductors 145 in a second region of the floor 204 to exhibit a second voltage different than the first voltage, the first and second regions not overlapping, as shown in FIG. 2. Due to this electric separation, the example first region 202 and the example second region 204 may also be used to convey the same signals, or different signals, to a robot and/or other equipment on the floor 140 at the same or different times.

The example power source 125 of FIG. 1 may include an example DC power source 205 and/or an example AC power source 210. Typically, the power source 125 will be implemented by a connection to a commercial power source (e.g., a connection to Commonwealth Edison or other public or private power company) but could alternatively be a source of locally generated power (e.g., a private generator of any type).

In the example of FIG. 2, the power delivery circuit 120 includes the example voltage conditioner 130, noted above. In this example, the example voltage conditioner 130 includes an example transformer 215, an example multiplexor 220, an example rectifier 225 and an example voltage regulator 230. The example transformer 215 is to receive a source of alternating current (AC) at a first input voltage and transform the first input voltage into a second output voltage. For example, a 220 volt AC input to the example transformer 215 may be transformed into an output voltage of 20 volts. In some examples, the conductive floor 140 uses a low voltage power (e.g., 20V, etc.) which is inherently safe to the touch (e.g., for incidental contact, etc.). Additionally, in some examples, added circuit protection (e.g., a ground fault control interrupt (GCFI) circuit, etc.) may be implemented to electrically isolate (e.g., within a fraction of a second, etc.) any conductors 402, 404 that are shorted for any reason (e.g., conductive foreign object, fluid, bodily contact, etc.). Thus, in at least such examples, people can walk on the conductive floor 140 without fear of shock or electrocution. In a case of an example multi-tap transformer 215, the input voltage may be converted to a plurality of different output voltages. The output(s) from the transformer 215 may be output to a rectifier 225 (e.g., to convert the AC output of the transformer to DC). The output of the rectifier 225 and/or the transformer 215 may be input to a voltage regulator 230 to filter the voltage of noise and/or the like and to maintain the voltage within a desired range (e.g., clip out voltage spikes, etc.).

The example rectifier 225 converts alternating current (AC) to direct current (DC). The example rectifier 225 may be implemented by any type of rectifier including, but not limited to a full-wave single-phase or a full-wave or a half-wave multi-phase (e.g., 3-phase) rectifier. The example rectifier 225 may further include a smoothing circuit (e.g., voltage regulator 230) to smooth the output of the example rectifier 225.

In some examples, a switch is present to connect a load to a DC power source in place of the AC source when, for example, a power outage occurs in the AC supply.

The example voltage regulator 230 seeks to maintain a constant voltage level independent of the power load. The voltage regulator 230 may be implemented by any type of voltage regulator, such as a linear regulator, a shunt regulator, a series regulator, a switching regulator, etc.

As mentioned above, the conductive floor includes a plurality of independent circuit paths. At least some of the circuit paths are electrically isolated from each other. One end of a circuit path (or end of a subset of such circuit paths) terminates in one (or a set of) charging contact(s) exposed in the surface of the conductive floor 140. The other end(s) of the circuit path(s) are in circuit with an output of a multiplexor 220. The multiplexor 220 is an electrically controllable switch that enables electrical connection of one or more inputs of the multiplexor to one or more outputs of the multiplexor in a switchable manner. In this way, the multiplexor 220 can be used to selectively and separately address one or more of the conductive paths and/or one or more regions of the conductive floor. As such, the multiplexor 220 can be used to deliver different voltages, current and/or power to different areas and/or regions of the floor 140. It can also be used to deliver signals modulated on such different voltages and/or currents to some or all of the floor to deliver specific messages to robot 110 and/or other equipment on the floor 140.

As such, in some examples, the conductive floor 140 is employed to convey information to a robot and/or other equipment on the floor 140. To this end, the example system 100 of FIG. 1 includes a server 195. In the example of FIG. 2, the server 195 includes at least one processor 260 and a memory 235. The example processor 260 is a semiconductor based device capable of executing machine readable instructions. For example, the processor may be implemented by an Intel® Core™ i7 processor commercially available from Intel. Any other type(s) and/or number(s) of processor(s) may be employed. The example memory contains power control data 240, such as example location data 245, example voltage data 250 and example schedule data 255. The example memory 235 of FIG. 2 may be implemented by any type(s) and/or any number(s) of non-transitory storage device(s) such as a hard drive, a flash memory, a read-only memory (ROM), a random-access memory (RAM), a cache and/or any other non-transitory storage medium in which information is stored for any duration (e.g., for extended time periods, permanently, brief instances, for temporarily buffering, and/or for caching of the information). The information stored in the memory 235 may be stored in any file and/or data structure format, organization scheme, and/or arrangement.

In the example of FIG. 2, the power control data 240 includes, for example, example location data 245, example voltage data 250, and example schedule data 255. In some examples, the example location data 245 includes location-specific data correlating voltage(s) and/or signals to be delivered to one or more regions of the example floor 140. In some examples, the voltage data 250 specifies voltage(s) to be applied to each of the one or more regions of the example floor 140. For example, the voltage data 250 may identify a first voltage to be applied to a first region 202 of the example floor 140, a second voltage to be applied to a second region 204 of the example floor 140, a third voltage to be applied to a third region of the example floor 140 and a fourth voltage to be applied to a fourth region of the example floor 140. In some examples, two or more of the first, second, third and fourth voltages are different. In some examples, the schedule data 255 includes times at which a particular voltage is to be applied to one or more regions of the example floor 140. For example, the schedule data 255 may include a first time period at which a first voltage is to be applied to the first region of the example floor 140 and a second time period at which a second voltage is to be applied to the first region of the example floor 140. The same or different voltages may be applied to different floor regions at the same time.

In the example of FIG. 2, the processor(s) 260 of the server 195 implements a robot controller 270. In the example, the robot controller 270 operates to define of the conductive floor 140 and control the multiplexor 220 to deliver desired voltage(s) to the defined regions (e.g., region 202 and region 204). The robot controller 270 may also modulate signals onto the voltages electrifying the floor 140 in order to communicate with one or more robot(s) 110 and/or other equipment on the floor 140. The robot controller 270 of some examples tracks the locations of the robot(s) 110 and/or other equipment and, then, controls the multiplexor 220 to deliver the modulated signals to specific area(s) when the robot(s) 110 or equipment are located. In some examples, rather than targeting specific regions of the floor 140 with modulated signals, the robot controller 270 broadcasts the modulated signals throughout the floor. The latter approach is advantageous in examples where the location of the robot(s) 110 and/or other equipment are not known or tracked by the robot controller 270.

The example server 195 of FIG. 2 also includes an example user interface 265. The user interface 265 includes an example input device 267 and an example output device 269. The example user interface device 265 of FIG. 2 facilitates interactions and/or communications between a user and the power delivery circuit 120, the example server 195, and/or the example power delivery circuit 120. The example input device 267 receives input data and/or commands from a user. By way of example, the input device 267 may include more than one input device such as a button, a keyboard, a keypad, a microphone, and/or a touchscreen. The example output device 269 presents information and/or data in visual and/or audible form to the user. For example, the output device 269 may include one or more devices such as a light emitting diode display, a touchscreen display, a liquid crystal display, a printer, and/or a speaker to present audible information. Data and/or information that is presented and/or received via the user interface 265 may be of any type, form and/or format, and may be stored in a computer-readable storage medium such as the example memory 235.

The example server 195 of FIG. 2 also includes an example communication interface 280. The example communication interface 280 of FIG. 2 includes an example transmitter 285 and an example receiver 290. The example communication interface 280 of FIG. 2 facilitates local and/or remote communication, such as communication over a network (e.g., a cellular network, a local area network, a wide area network, etc.) with the server 195. In some examples, the example transmitter 285 may include a cellular device, a modem, a Bluetooth device and/or a 10 BasebandT hub. The example transmitter 285 of FIG. 2 transmits data and/or control signal(s). In some examples, the data and/or control signal(s) transmitted by the transmitter 285 are communicated via a network. In some examples, the transmitter 285 may transmit power control data 240, including location data 245, voltage data 250 and/or schedule data 255. Data and/or control signal(s) transmitted by the transmitter 285 may be of any type, form and/or format, and may be stored in a non-transitory computer-readable storage medium such as the example memory 235.

The example receiver 290 of FIG. 2 collects, acquires and/or receives transmitted data and/or control signal(s). In some examples, the data and/or control signal(s) received by the example receiver 290 is/are communicated via a network. In some examples, the example receiver 290 receives data and/or control signal(s) corresponding to power control data 240, location data 245, voltage data 250 or schedule data 255. Data identified and/or derived from the signal(s) collected and/or received by the receiver 290 may be of any type, form and/or format, and may be stored in a non-transitory computer-readable storage medium, such as the example memory 235.

Figure 3:
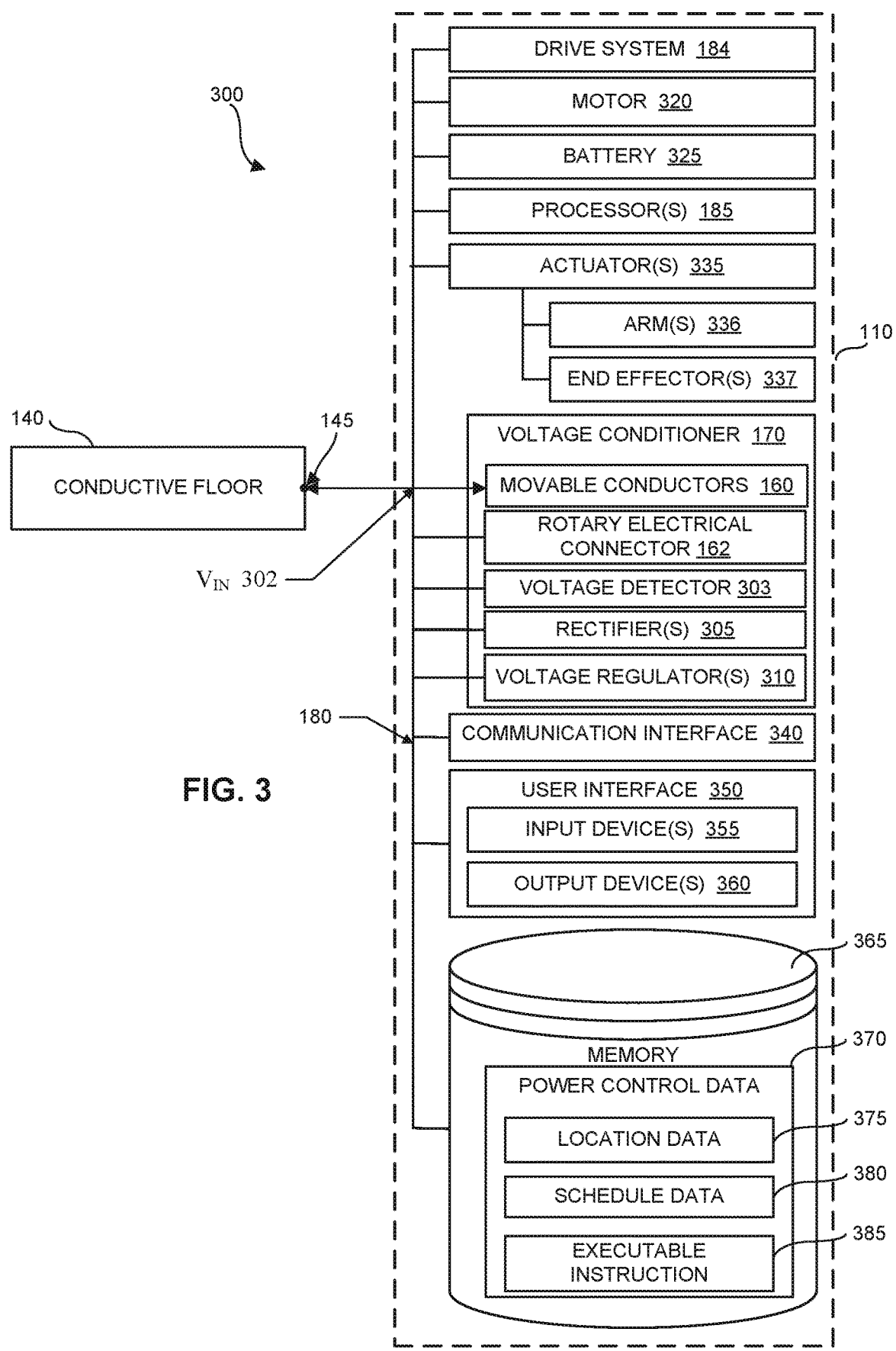
FIG. 3 is a block diagram of an example implementation of the robot of FIG. 1.

FIG. 3 is a block diagram of an example implementation of the example ambulatory robot 110 of FIG. 1. In the example of FIG. 3, the example conductive floor 140 provides an input voltage (e.g., VIN) 302 to movable conductors or contacts 160 on a bottom movable surface of the robot 110 via charging contacts 145. In some examples, the conductors or contacts 160 are a plurality of discrete contacts capable of making and breaking circuits with the charging contacts 145 exposed in the surface of the floor 140.

This input voltage 302 is passed, via an example rotary electrical connector 162, to an example voltage conditioner 170, which conditions the input voltage. In the example of FIG. 3, the voltage conditioner 170 includes an example rectifier 305 (see also FIG. 5) to rectify the voltage received via the movable conductors 160 and an example voltage regulator 310 to smooth the output voltage of the example rectifier 305.

The robot 110 of this example includes an example drive system 184, an example motor 320, an example battery 325, an example processor 185 and an example actuator 335, each in communication with a bus 180. Any manner of robot 110, drive system 184, motor 320 and/or battery 325 may be used with the conductive floor(s) disclosed herein, as long as suitable contacts are implemented for power transfer.

In some examples, the example drive system 184 includes a 2-wheel drive (e.g., one gear box), a 4-wheel drive with 2 gearboxes (e.g., one gear box for each pair of wheels), a 3-wheel drive (e.g., one gear box), a 4-wheel drive with 4 gearboxes (e.g., each wheel being separately driven), a 6-wheel drive with 2 gearboxes (e.g., one gear box for each three wheels on each side of the robot), a 6-wheel drive with 6 gearboxes (e.g., each wheel being separately driven), or generally an n-wheel drive where n is any integer. In some examples, the wheels each include a tread or other surface that moves to propel the robot across the floor 140. In some examples, the wheels are adapted to retain and drive a continuous track. In some examples, the drive system 184 includes a differential wheeled robot 110 whose movement is based on two separately driven wheels placed on either side of the robot body. In this configuration, the robot 110 is able to change its direction by changing the relative rate of rotation of its wheels. Additional wheels (e.g., idler wheels, such as a caster, ball or omniwheel) may be added for balance and/or load distribution. Rather than a tire or wheel, the robot 110 may use an omnidirectional ball embedded with contacts as its propelling mechanism.

In some examples, the example battery 325 includes secondary cells or rechargeable batteries, such as a nickel-metal hydride (NiMH) battery, a lithium-ion battery, and/or a lithium polymer (LiPo) battery. In some examples, the example robot 110 omits the battery 325 and relies entirely upon the conductive floor 140 for power, thus reducing the weight of the robot and increasing the efficiency of its energy usage (by not moving a battery). Thus, in some examples, the robot 110 does not carry a portable power supply to drive the motor 320. Because a power source is readily provided through the conductive floor, the robot 110 can include a battery 325 which is smaller than the expected power requirements needed to complete some designated tasks. Moreover, in some such examples, the power provided by the conductive floor 140 is only used during power-demanding tasks (e.g., lifting a cargo, spot welding, laser cutting, creating static charge, etc.) whereas the smaller internal battery can be relied on for less power demanding tasks.

The example processor 185 for the example robot 110 of the illustrated example may be implemented by one or more microprocessors, controllers and/or processors of any type(s). The example processor 185 of FIG. 2 is programmed using any computer-language (e.g., C, C++, C#, Processing (a variation of C++), Java, Python, .Net, Basic, etc.) to perform any desired functions.

The example robot 110 of FIG. 3 includes an actuator 335 to drive one or more arms 336, one or more end effectors 337 and/or other tool or device by which the robot 110 interacts with its environment. The actuator 335 is to convert energy into physical motion used to move the arm 336, end effector 337 and/or other tool or device. The example actuator 335 of FIG. 3 may be implemented by a linear actuator, a solenoid, and/or a rotary actuator. In some examples, the actuator 335 includes a pneumatic actuator (e.g., an artificial muscle, etc.).

The example robot 110 of FIG. 3 also includes an example communication interface 340. The communication interface 340 of FIG. 3 may include an example transmitter, an example receiver, or a transceiver, to facilitate local and/or remote communication with an external system, such as communication over a network (e.g., a local area network, a wide area network, etc.). In some examples, the communication interface 340 of FIG. 3 includes a cellular device, a modem and/or a Bluetooth device to communicate data with an external system via one or more signal(s). The communication interface 340 of FIG. 3 transmits and/or receives any type of data. In some examples, the communication interface 340 transmits its location to the server 195. In some examples, the communication interface 340 includes a decoder and/or demodulator to identify data contained in modulated signals received via the movable conductors 160 via the conductive floor 140.

The example robot 110 of FIG. 3 includes an example user interface 340. The user interface 340 includes an example input device 355 and an example output device 360. The example user interface 340 of FIG. 3 facilitates interactions and/or communications between a user and the example robot 110. The input device 355 receives input data and/or commands from a user. By way of example, the input device 355 may include more than one input device such as a button, a keyboard, a keypad, a microphone, and/or a touchscreen. The example output device 360 presents information and/or data in visual and/or audible form to the user. For example, the output device 360 may include one or more devices such as a light emitting diode display, a touchscreen display, a liquid crystal display, a printer, and/or a speaker to present audible information. Data and/or information that is presented and/or received via the user interface device 340 may be of any type, form and/or format, and may be stored in a computer-readable storage medium such as the example non-transitory computer-readable memory 365.

The example robot 110 of FIG. 3 includes a non-transitory computer-readable memory 365. The non-transitory computer-readable memory 365 may be implemented by any type(s) and/or any number(s) of non-transitory storage device(s) such as a hard drive, a flash memory, a read-only memory (ROM), a random-access memory (RAM), a cache and/or any other non-transitory storage medium in which information is stored for any duration (e.g., for extended time periods, permanently, brief instances, for temporarily buffering, and/or for caching of the information). The information stored in the memory 365 may be stored in any file and/or data structure format, organization scheme, and/or arrangement.

The robot 110 may operate independently of the server 195 based on instruction sets (e.g., one or more programs and/or data, etc.) stored in the non-transitory memory 365. The robot's 110 program could be overridden or suspended, modified or replaced by commands from the server 195 via modulated signals or based on predetermined commands identified by voltages in regions of the conductive floor 140. For example, the robot 110 may be programmed to interpret a voltage level received via the movable conductor 160 as a command to enter a certain mode, turn off, turn around, take a certain action, etc. In this way, establishing certain voltages in certain regions can serve to control the robot 110, set certain boundaries, etc. The voltages and their corresponding messages/commands can be stored in a lookup table in the robot's memory 365.

In some examples, the example memory 365 stores power control data 370, location data 375, schedule data 380 and/or executable instructions or code 385. Additionally and/or alternatively, in some examples, the location data 375 includes one or more locations at which the example robot 110 is to perform one or more functions or actions. The location data 375 may include navigation data to facilitate movement of the example robot between locations. In some examples, the schedule data 380 includes a schedule of instruction sets (e.g., executable instructions or code 385) to be performed by the robot 110 at different times, and possibly in different locations in accord with the location data 375. Thus, in combination, for example, the location data 375, the schedule data 380 and the executable instructions or code 385 may designate a first function to be executed at a first region (see, e.g., FIG. 2) of the conductive floor 140 at a first time, a second function to be executed at a second region (see, e.g., FIG. 2) of the conductive floor 140 at a second time, and so on. In some examples, rather than specify a location, the robot 110 is programmed to react to voltage levels as explained above to control its behavior/actions upon entering and/or when in a region exhibiting a corresponding voltage level.

Use of the example conductive floor 140 enables an example robot 110 that is mobile, such as an example industrial cleaning robot, the freedom to move anywhere in the facility and to continue operation for whatever duration is required to complete any associated task or tasks. In some examples, the example robot 110 does not have a local battery, but nevertheless can run incessantly as it is always connected to power. In such examples, if the robot were to inadvertently lose contact with the example conductive floor 140 (e.g., crashing, falling over, etc.), the example robot 110 would lose power and stop, preventing any further potential for damage. This automatic disconnect will not happen if the robot 110 also operates on battery power. In some examples, the robots 110 having a local battery 325 include a switch (e.g., an orientation switch, a gyroscope, etc.) to deactivate and/or disconnect the local battery 325 if the robot is not in an operative position (e.g., upright).

Figure 4A:
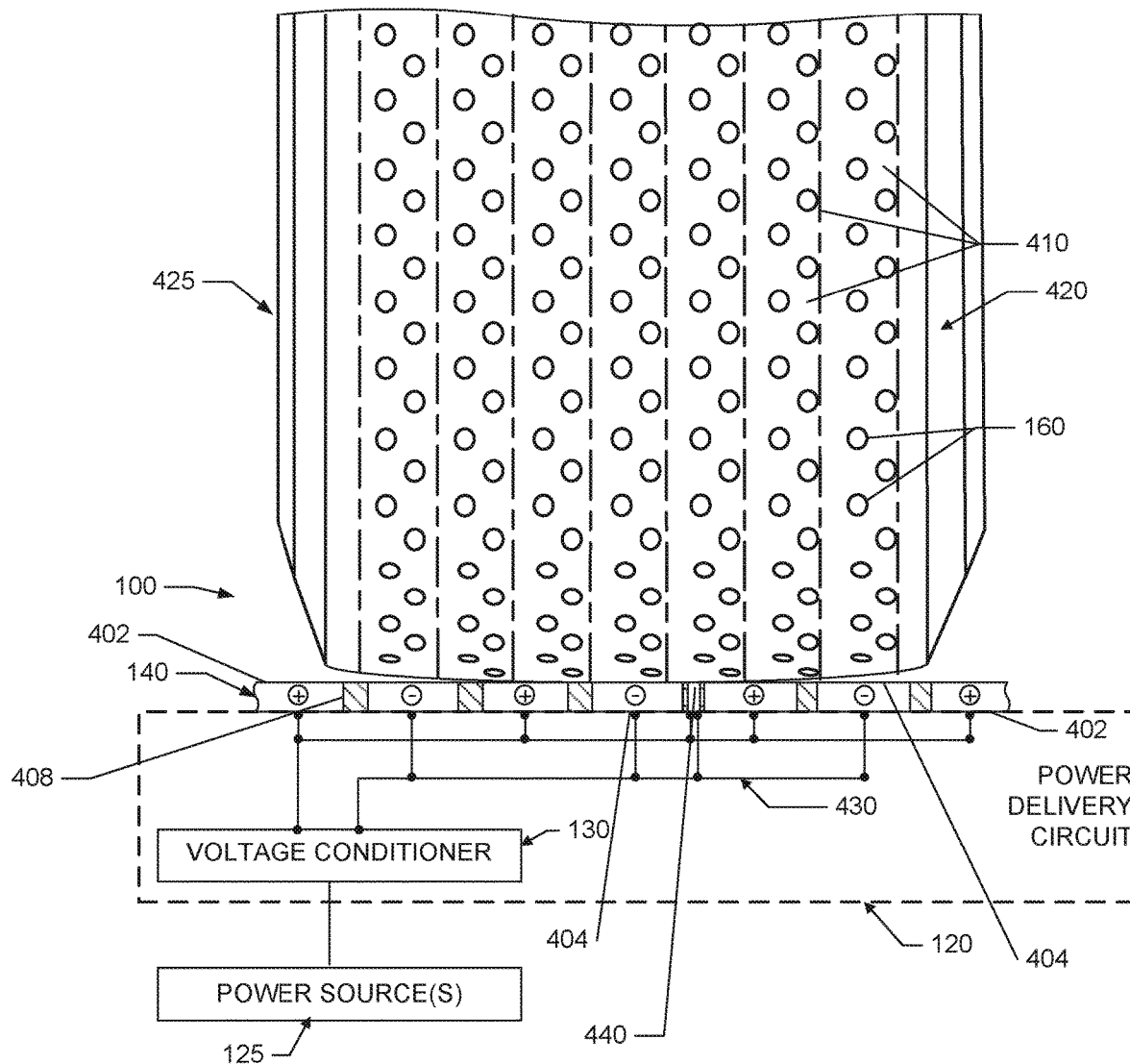
FIGS. 4A-4C illustrate example implementations of the power delivery system and robot of FIGS. 1-3.
Figure 4B:
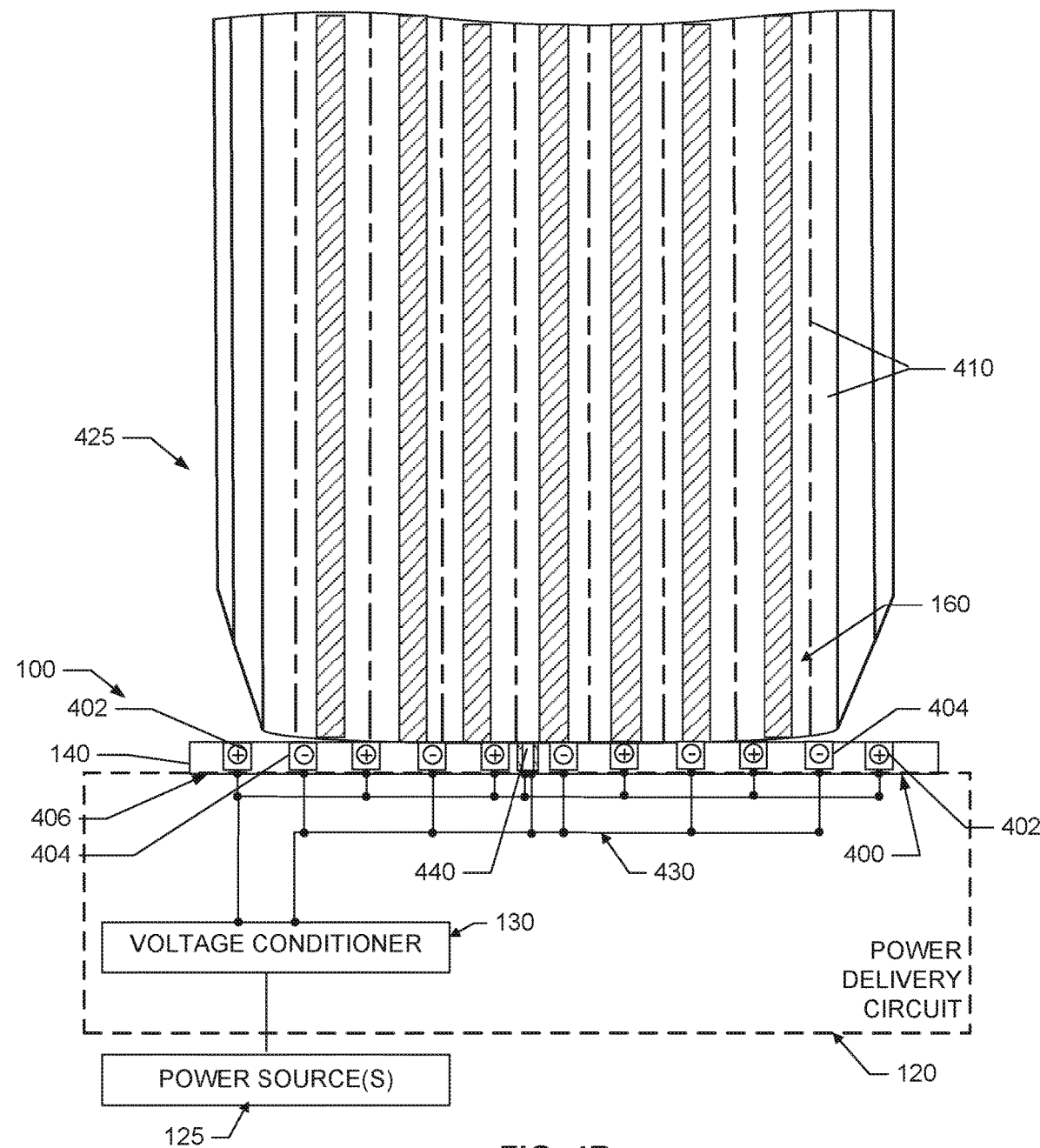
Figure 4C:
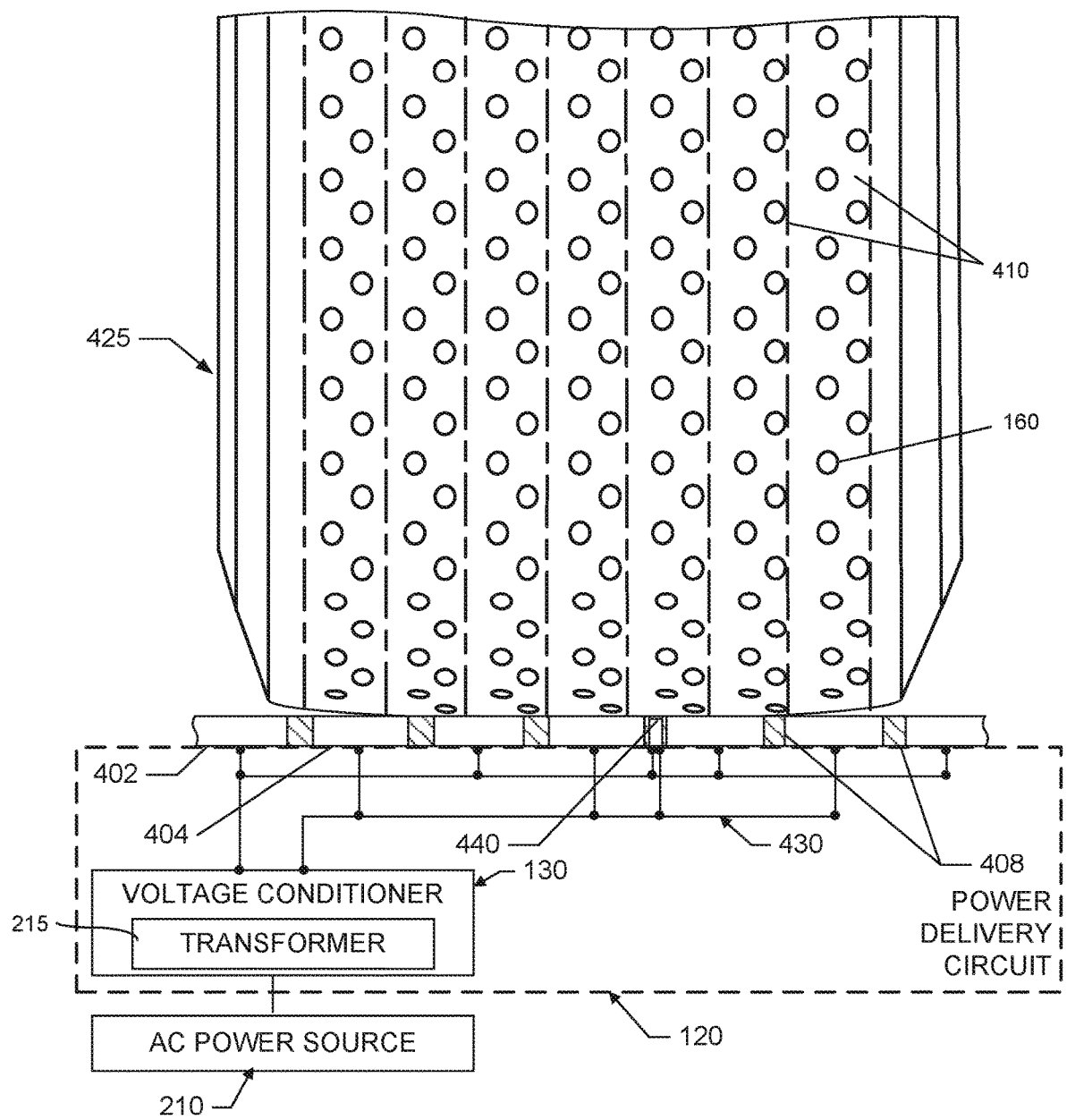

FIGS. 4A-4C illustrate example implementations of the power delivery system 100 and robot 110 of FIGS. 1-3. Each of FIGS. 4A-4C shows an example conductive floor 140 to power a robot located on the floor 140. In some examples, a non-ambulatory robot 400 can be powered from any position on the floor 140 without plugging a cord into, for example, a wall or floor socket and without using an extension cord. In some examples, non-ambulatory equipment (e.g., hospital electronic equipment, etc.) can be placed into circuit with power by placing the equipment on the floor and without plugging in a cord to tap a source of power. In the example of FIGS. 4A-4C, the example floor 140 includes a plurality of stationary conductors 402, 404 positioned in a pattern. A power delivery circuit 120 applies different electric potentials to adjacent ones of the conductors 402, 404. For example, conductors 402 have a positive polarity and conductors 404 have a negative polarity in the example illustrated in FIG. 4A.

In some examples, the power delivery circuit 120 is to cause a first set of the conductors 402, 404 in a first region 202 (see FIG. 2) of the floor 140 to have a selected one of a plurality of different voltages at a first time and to cause the first set of the conductors 402, 404 in the first region 202 of the floor to have another selected one of the plurality of different voltages at a second time. In some examples, the power delivery circuit 120 is to cause a first set of the conductors 402, 404 in a first region 202 (see FIG. 2) of the floor 140 to have a selected first non-zero voltage at a first time and to cause the first set of the conductors 402, 404 in the first region 202 of the floor 140 to have a second non-zero voltage at a second time. In some examples, this first non-zero voltage is to cause a robot 110 to operate in a first operational state or mode and the second non-zero voltage is to cause the first robot to operate in a second operational state or mode as described below, for example, in FIG. 9.

In the example pattern depicted in FIGS. 4A and 4C, the example conductors 402, 404 are arranged as alternating slats (e.g., elongated conductive boards running in and out of the page in FIG. 4A). Each adjacent pair of conductors 402, 404 (e.g., slats in the example of FIGS. 4A and 4C) are separated by an insulator 406 (e.g., an insulating slat, insulating material, etc.) disposed therebetween to electrically isolate each of the adjacent conductors 402, 404 from one another.

In the example pattern depicted in FIG. 4B, the example conductors 402, 404 are arranged as an array of spaced-apart contacts disposed in an insulator 406 matrix. The conductors 402, 404 are point contacts. Each point contact is surrounded by the insulator in the plane of the insulator, but the upper surface of the contact is exposed for electrical connection. The insulator, thus, electrically isolates adjacent ones of the point contacts from one another, while enabling the contacts to be placed into circuit with one another when simultaneously engaged by, for example, movable conductors or contacts 160 on a bottom surface of an ambulator robot 110 and/or engaged by conductors on the bottom surfaces of a non-ambulatory robot or stationary device. In each of the example patterns of FIGS. 4A-4C, the conductors 402, 404 of the example floor 140 enable formation of a circuit to deliver power to a robot or other equipment via electrical contact with conductors 160 present on a bottom surface of the robot. In some examples, the example conductors 402, 404 of the conductive floor 140 define an array of power nodes and ground nodes (e.g., 0 volts). In some examples, the conductors or contacts 160 of the wheel 425 define an array of power nodes and ground nodes positioned to rotate with the wheel.

In the examples shown in FIGS. 4A-4C, a tread 410 of a tire and/or wheel 425 forms the insulator matrix. The wheel 425 may be implemented by a standard wheel having two degrees of freedom, a castor wheel with two degrees of freedom, a Swedish 45° or Swedish 90° wheel having three degrees of freedom, and/or a spherical wheel (e.g., a BB-8 style roller, etc.). In some examples, the conductors 160 are formed on a continuous track implemented by a continuous band of treads having example conductors 160 formed therein or disposed thereon.

The example conductors 160 of FIGS. 4A and 4C are electrical point contacts disposed in a pattern (e.g., an array, a repeating arrangement, etc.) in a tread 410 (e.g., an insulator matrix). The tread 410 is disposed between each example conductor/point contact 160. In some examples, the example conductors/point contacts 160 are dimensioned and positioned in an example pattern to ensure that, at most positions of the bottom surface of the robot on the floor, a circuit is formed via the example conductors 402, 404 (e.g., adjacent slats having different potentials) and the example conductors/point contacts 160 to deliver power to the robot (e.g., 110, FIG. 1) and/or other equipment.

While in the examples of FIGS. 4A and 4C, the robot 110 carries point contacts, in the example of FIG. 4B, the example conductors 160 carried by the robot 110 are bands disposed in or on a tread 410 and the point contacts are located on the floor 140. The tread 410 is disposed between each example conductor 160. In some examples, the example conductors/point contacts 160, 402, 404 are dimensioned and positioned in an example pattern to ensure that, at most positions of the bottom surface of the robot on the floor, a circuit is formed via the example conductors 402, 404 (e.g., adjacent slats having different potentials) and the example conductors/point contacts 160 to deliver power to the robot (e.g., 110, FIG. 1) and/or other equipment. With respect to FIG. 4A, for example, a circuit is formed when a first conductor/point contact 160 of the wheel 425 contacts a first conductor 402 having a first electric potential and a second conductor/point contact 160 of the example wheel 425 contacts a second conductor 402 having a second electric potential.

In the examples of FIGS. 4A-4C, a width or a maximum lateral dimension of the example insulator 406 between the conductors 402, 404 is selected to be wider than a width of the example conductors/point contact 160 to prevent the example conductors/point contacts 160 from shorting across the example conductors 402, 404.

In FIGS. 4A-4C, the example power delivery circuit 120 is connected to the example conductors 402, 404 via electrical circuit paths 430. For instance, example conductors 402 are connected to conductive paths 430 the example power delivery circuit 120 such that they exhibit a positive polarity, whereas example conductors 404 are connected to the conductive paths 430 of the example power delivery circuit 120 such that they exhibit a negative polarity or ground. The connection can be changed by manipulating the state of a multiplexor 225 in the voltage conditioner 130 as explained above. One or more multiplexors 225 can be employed, depending on the number of conductive paths to be addressed/selected.

In some examples, one or more lights 440 (e.g., LEDs, bulbs, light pipes, fiber optic lights, etc.) of one or more colors (e.g., one color, two colors, three colors, etc.) are embedded in the conductive floor 140 to provide a visual indication of a state (e.g., powered, unpowered, first electric potential, second electric potential, etc.) of the floor 140 and/or one or more regions of the floor 140.

In the examples depicted in FIGS. 4A-4B, the example conductors 402, 404 of the floor 140 are shown, by way of example, to have a designated polarity (e.g., example conductors 402 have a positive polarity and example conductors 404 have a negative polarity) representing a direct current (DC) voltage. In other examples, alternating current (AC) may be used to provide power through the example conductors 402, 404 of the example floor 140, such as via the example AC power source 210 and the example voltage conditioner 130 of FIG. 4C.

Figure 5:
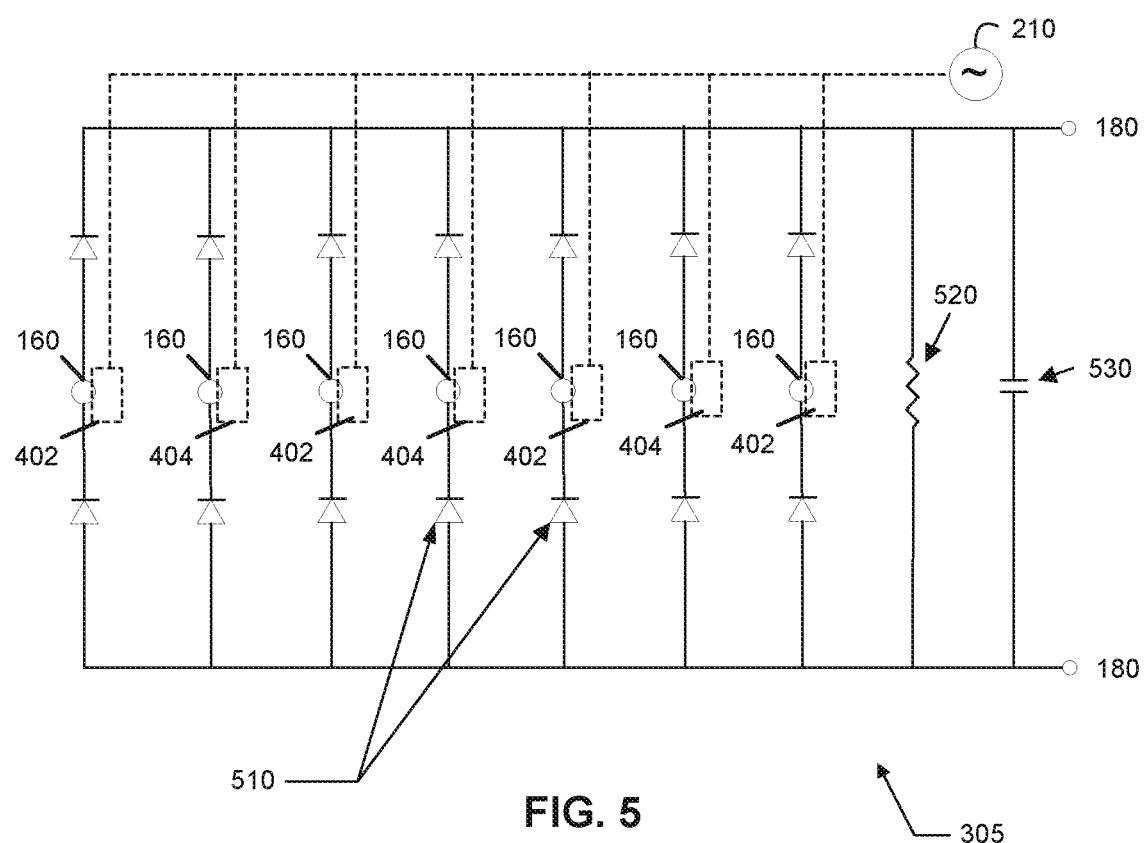
FIG. 5 represents an example rectifier circuit for use in any of the example power delivery systems of FIG. 1-3, 4A-4B or 4C.

FIG. 5 represents an example full-wave rectifier circuit 305 which may implement the rectifier 305 of the robot of FIG. 3. Such a rectifier 305 is implemented when, for example, the example floor 140 is powered with an alternating current supplied by, for example, the AC power source 210. In such an example, the robot 110 uses the rectifier 305 to convert the alternating current to direct current for use by DC loads. Inputs to the example full-wave rectifier circuit 305 include alternating current received from the AC power source 210 via the movable conductors 160 contacting the conductors 402, 404 of the conductive floor 140. The example full-wave rectifier circuit 305 of FIG. 5 includes diodes 510 to control current flow. An example resistor 520 and an example capacitor 530 are coupled as an RC filter and act as a smoothing circuit to produce a steady direct current output from the example full-wave rectifier circuit 305. In some examples, a capacitor-input filter, an active voltage regulator circuit, or a choke-input filter are used to provide a smooth current waveform to bus 180.

Figure 6:
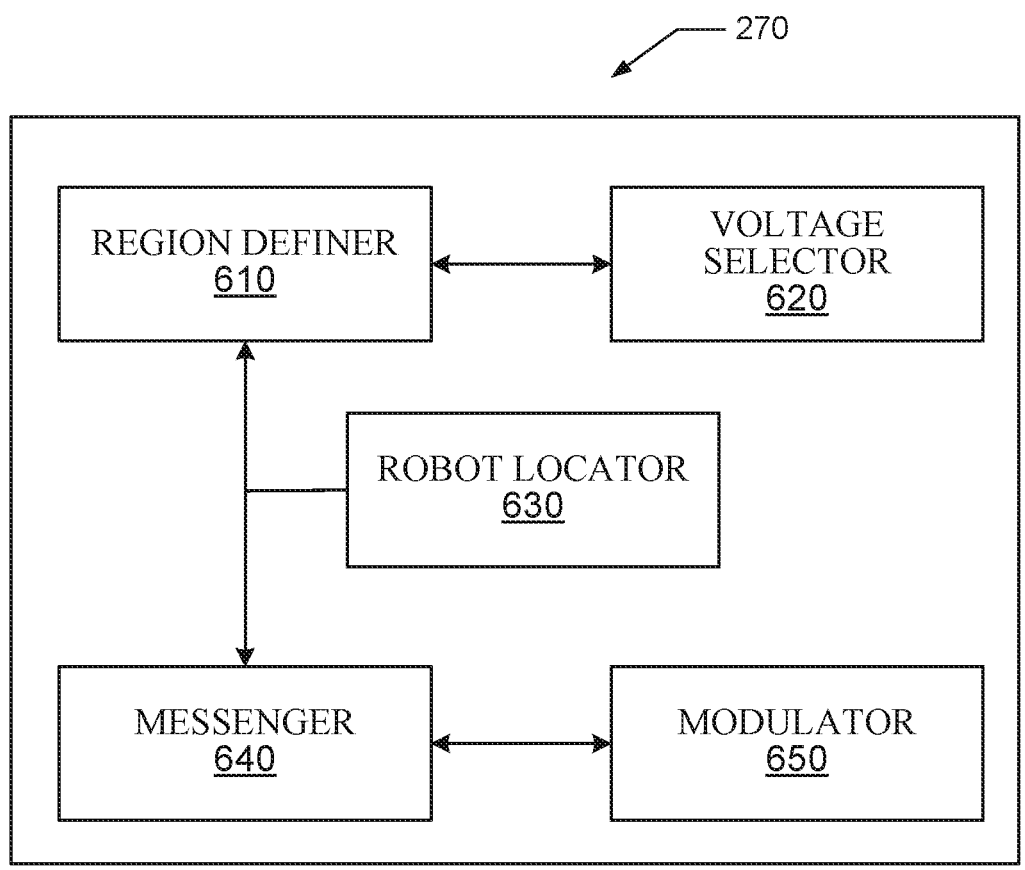
FIG. 6 is a block diagram of an example implementation of the robot controller of FIG. 2.

FIG. 6 is a block diagram of an example implementation of the robot controller 270 of FIG. 2. In the example implementation of FIG. 6, the robot controller 270 includes an example region definer 610, an example voltage selector 620, an example robot locator 630, an example messenger 640 and an example modulator 650.

In general, the example robot controller 270 is to establish voltage(s) in one or more regions of the conductive floor 140 to control operations of the robot 110. In some examples, the robot controller 270 also sends modulated signals (e.g., instructions, information, etc.) to a robot 110 and/or other equipment on the conductive floor 140. In the example implementation of FIG. 6, the example region definer 610 is to define one or more regions of the conductive floor 140 where the robot 110 is to operate in certain ways (e.g., faster, slower, quieter, etc.) and/or to take certain actions (e.g., turn around, shut down, etc.). Once the region definer 610 has identified these areas (e.g., based on data in the memory 235 such as the location data 245), the voltage selector 620 of the example of FIG. 6 determines the specific voltage levels to be established in the corresponding regions in order to cause the robot 110 to behave as desired in these locations. These voltages can be established by convention and/or agreement and stored in, for example, a lookup table (LUX) in the memory 235 of the server or the voltage data 250. In other words, the LUX may map the location data (e.g., type of location such as ramp, exit, quiet zone, elevated area, etc.) to the voltage data that will inform a robot 110 of the acts to take/make to enter. The voltage selector 620 of the illustrated example controls the multiplexor 225 to couple the appropriate voltage levels to the conductive floor in the corresponding region.

Figure 7:
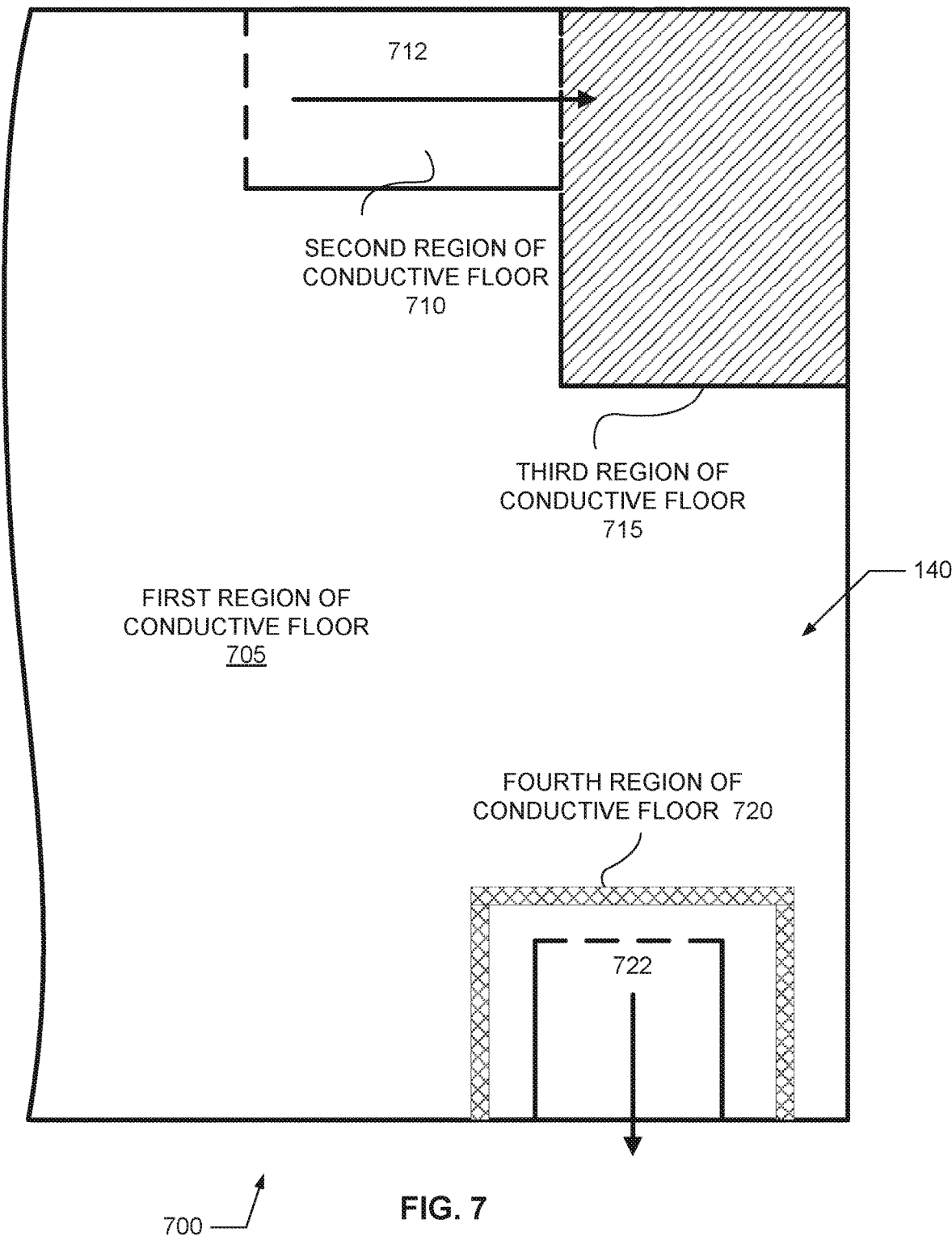
FIG. 7 illustrates an example implementation of the conductive floor of FIG. 1 as managed by the robot controller of FIGS. 2 and/or 6.

FIG. 7 illustrates an example conductive floor 140 of an example portion of an industrial facility 700. In this example, the region definer 610 has defined an example first region 705, an example second region 710, an example third region 715, and an example fourth region 720. The example second region 710 corresponds to an area including a ramp 712 connecting the example first region 705 and the example third region 715. At any particular time, any of the different regions of the example conductive floor 140 may exhibit the same voltage, or may present different voltages, and may be further used to convey modulated signals (e.g., a signal modulated over a voltage passed to robot 110 or other electronic device electrically connected to a region of the example conductive floor 140, etc.) providing information to a robot 110 or another electronic device. By way of example, the example second region 710 is an area including a ramp 712. It exhibits a first voltage different (e.g., a higher voltage, etc.) than the second voltage exhibited in the first region 705 of the example conductive floor 140 (e.g., a floor area) to provide additional power to an ambulatory robot 110 moving up the ramp 712.

As another example, the third region of the conductive floor 715 represents a raised platform where slower speeds are advised. Thus, the voltage supplied in the third region 715 is selected by the voltage selector 620 to correspond to a slow speed operation. The correspondence between the slow speed operation and the third voltage exhibited in the third region can be established by convention and stored in, for example, a lookup table (LUX) in a memory of the robot 110. Therefore, when a robot 110 enters the third region 715, it will detect the third floor voltage via the voltage detector 303 and look the detected voltage up in memory. Based on the correlation found in the robot memory between the detected voltage and a desired operating mode or action, the processor 185 of the robot 110 will adjust the operation of the robot to enter the corresponding operating mode or take the prescribed action.

As another example, the fourth region of the floor 720 exhibits a fourth voltage different than the first, second and third voltages described above. The fourth region in this example represents an exit to the illustrated building or any other area where the robot 110 is not to travel. Upon detecting the fourth voltage, the robot 110 will determine via the lookup table in its memory that it must stop and/or turn around. In this way, the fourth voltage can serve as a boundary to confine the robot 110 to a specific area.

In some examples, different operations, actuations and/or tasks are to be performed by a robot in a same area/floor plan at different times (e.g., cleaning time versus manufacturing time, etc.). As such, the regions identified by the region definer 610 and/or the voltages selected by the voltage selector may change over time (e.g., be different at a first time than at a second time, etc.) by simply modifying the voltages applied in the regions of the floor 140, the robot controller 270 can cause the robot(s) 110 on the floor 140 to behave differently. For example, the power delivery circuit 120 of FIG. 1 may cause a first set of the conductors 402, 404 in a first region of the conductive floor (e.g., first region 705 of example conductive floor 140) to have a selected one of a plurality of different potential differences (e.g., 220V) at a first time and to cause the first set of the conductors 402, 404 in the first region of the conductive floor (e.g., first region 705 of conductive floor 140) to have a different voltage (e.g., 120V) at a second time. Other regions of the example conductive floor 140, such as the second region 710 or the third region 715, are operated independently of one another and deliver, at any specified time, a voltage selected to achieve the desired robot operations at the corresponding time.

In other words, the one or more regions defined by the example region definer 610 are not necessarily static and may be changed in accord with a schedule or lookup table (e.g., different shifts in a factory, different processing stages, different work-flow requirements, etc.), re-alignment of or reallocation of processes or equipment (e.g., moving equipment to a different portion of a facility, implementation of different processing steps, etc.). In other examples, the voltages change dynamically based on events or other criteria (e.g., increasing a potential difference of the example second region 610 only when a robot 110 is moving up the example ramp 615, shutting down all robots in response to a smoke detector, etc.). For example, in a day shift, a first region 705 of a conductive floor 140 is maintained at a first voltage and, in a night shift, the same first region 705 of the conductive floor 140 may be maintained at a second voltage higher than the first voltage. This higher voltage in the same region could, for example, enable ambulatory robots 110 to travel more quickly at times presenting less traffic and, thus, fewer potential obstacles.

In the example robot controller 270 of FIG. 6, the example voltage selector 620 provides a lookup table mapping voltages to desired operations, actions, etc. enable the example region definer 610 to assign different voltages to different regions of the conductive floor 140 to achieve different effects.

However, in some examples, the robot controller 270 is not limited to controlling robots 110 based on the power supplying voltages established in the floor. Instead, the example robot controller 270 of FIG. 6 is able to address specific robots and/or equipment by broadcasting or otherwise sending signals modulated on the power supply voltages of the conductive floor 140. To this end, the example robot controller 270 of FIG. 6 includes a messenger 640 and a modulator 650. The messenger 640 of the illustrated example prepares messages (e.g., data or commands) to be sent to robots or equipment (e.g., operating system, later action commands, etc.). The modulator 650 of the illustrated example modulates the messages onto the power supplying voltages. The messenger 640 and/or modulator 650 in the example coordinate with the multiplexor 225 to modulate the signal/message onto voltage in one or more specific areas. In other words, the messenger 640 of the illustrated example is able to address messages to robots and/or other equipment in specific areas.

To facilitate this messaging, the robot controller 270 of this example includes a robot locator 630. The example robot locator 630 of FIG. 6 develops data identifying the location of a given robot. This data may be used as an input for messaging to the robot via the example messenger 640. A location of an example ambulatory robot 110 may be determined by radiolocation, radionavigation, multilateration, a GPS system, and/or a local positioning system (LPS) using the communication interface 340 of the robot 110. In other examples, a location of an example ambulatory robot 110 may be determined by detecting local changes, such as voltage fluctuations in the conductive floor 140, and/or by using local area cameras, machine vision of the example ambulatory robot 110 (e.g., broadcasting images and/or video to server 195, etc.) and/or machine vision of other ambulatory or non-ambulatory robots in a vicinity of the example ambulatory robot 110. In some examples, a location of the example ambulatory robot 110 is continuously or intermittently broadcast to the server 195 for storage as, for example, location data 245. The robot locator 630 receives and/or collates this data and identifies the location of the robot(s) 110 and/or other equipment located on the floor.

In the example implementation of FIG. 6, the example messenger 640 coordinates messaging to robots and/or other equipment on the conductive floor 140. The messages are in the form of a signal delivered via the example conductive floor 140, such as a modulated voltage passed to an example robot 110 on top of the voltage used to govern the robot 110 or other equipment located on the conductive floor 140 via example conductors 402, 404 of the conductive floor 140 and corresponding conductors or contacts on the robot or other equipment. These modulated signals may be sent in a continuous or intermittent manner, depending on the level of the communication required. In some examples, the modulated signals are uniquely directed to (e.g., addressed to) a particular robot and/or a particular piece of equipment and are conveyed to a portion of the conductive floor 140 on which the robot and/or piece of equipment is located based on the information gathered by the robot locator 630. In some examples the modulated signal provides information to the example robot 110 or to other electronic devices, including location-specific instructions (e.g., room identification, noise limits, functions to be enabled or disabled, permissible operating states, etc.). To illustrate, FIG. 7 shows an example fourth region 720 that is an "off limits" area for ambulatory robots 110 on the first region 705 of the example conductive floor 140. A specific robot 110 in this fourth region 720 may receive, from the example messenger 640 and modulator 650, a modulated signal that enables the robot 110 to ignore the boundary established by the level of the voltage in the area 720 and exit the area. This override may be done, for example, to send the robot to a safer area or in an emergency (e.g., to protect the robot by exiting an area where fire has been detected). An ambulatory robot 110 moving into the fourth region 720 receives this modulated signal via the conductive floor 140. The processor 185 of the robot 110 analyzes this modulated signal by looking it up in its LUX to determine its meaning (e.g., "override local floor voltage command"). In view thereof, the processor 185 of the ambulatory robot 110 then implements the commanded action (e.g., exit, FIG. 7).

In some examples, the modulated signals are specifically addressed to specific robots 110 and/or other equipment. For example, the modulated signal may include a packet header that specifically identifies the intended recipient (e.g., by a media access control (MAC) address, by Internet Protocol Address, etc.). The packet header may be followed by a payload including data representing one or more commands. The data can be integrated in any way by the processor 185 of the robot 110 and/or other equipment (e.g., by looking the data up in the LUX as mentioned above).

Rather than specifically addressing a particular robot and/or other equipment, the messenger 640 may cooperate with the multiplexor 225 to send messages (broadcast message to all and for specifically addressed messages) to specific region(s) of the floor (e.g., one region, less than all regions, etc.). For example, such messaging may be done when the payload of the message is only intended to be followed by robot(s) and/or other equipment (who may or may not be specifically addressed) in certain region(s). Additionally or alternatively, such messaging may be sent in a region specific manner (e.g., over only the conductive pathways in the region(s) intended to receive the message) when, based on the data collected by the robot locator 630, the messenger 640 knows to region(s) in which the intended recipients are located. Such an approach advantageously reduces unnecessary signals on the conductive floor, thereby saving processing resources (e.g., of the robot(s) 110 and/or other equipment) and/or reducing the chance of error (e.g., unwanted effects due to misaddressed commands).

In some examples, the example messenger 640 broadcasts, via the example conductive floor 140, a modulated signal to a robot 110 and/or other equipment located on the conductive floor to cause the robot 110 and/or other equipment to transition to a lower-power operating mode (e.g., to cause the robot to move at a slower speed, save power, reduce noise, etc.). In other examples, the modulated signal may cause the robot 110 and/or other equipment to disable one or more operating modes (e.g., to cause higher order compute functions to go into a sleep mode, to disable communications in a no-WiFi zone, etc.). In another example, a modulated signal broadcast to the example fourth region 720 in FIG. 7 is used to define a boundary to be honored by the example robot 110 and instructs a robot 110 to stop and/or reverse direction or otherwise move in a direction away from the example fourth region 720. In some examples, the robot 110 stores an instruction set mapping modulated signals received via the contacts 160 disposed along a tread 410 of a tire or wheel 425 to actions to be taken. In some examples, the modulated signal may carry an instruction (selected from the instruction set) to cause the robot 110 to activate a function, deactivate a function, change a direction of travel and/or operate under a constraint or change a state. In some examples, the constraint includes a speed constraint or a movement constraint.

The example modulator 650 in the example implementation of FIG. 6 is to generate the signals to convey based on instructions from the example messenger 640. For example, the example modulator 650 can be implemented by any type of modulator circuit to perform any type of modulation (e.g., PSK, FSK, ASK, etc.) on a voltage on any region(s) of the conductive floor 140 to convey the desired instruction.

While an example manner of implementing the example robot controller 270 is set forth in FIG. 6, one or more of the elements, processes and/or devices illustrated in FIG. 6 may be combined, divided, re-arranged, omitted, eliminated and/or implemented in any other way. For example, the example region definer 610, the example voltage selector 620, the example robot locator 630, the example messenger 640 and/or the example modulator 650 of FIG. 6 may be implemented by hardware, software, firmware and/or any combination of hardware, software and/or firmware. Thus, for example, any or all of the example region definer 610, the example voltage selector 620, the example robot locator 630, the example messenger 640 and/or the example modulator 650 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example region definer 610, the example voltage selector 620, the example robot locator 630, the example messenger 640 and/or the example modulator 650 are hereby expressly defined to include a non-transitory computer-readable storage device or storage disk such as a memory, a digital versatile disk (DVD), a compact disk (CD), a Blu-ray disk, a flash memory, etc. storing the software and/or firmware. Further still, the example region definer 610, the example voltage selector 620, the example robot locator 630, the example messenger 640 and/or the example modulator 650 of FIG. 6 may include one or more elements, processes and/or devices in addition to, or instead of, those illustrated in FIGS. 1-2, for example, and/or may include more than one of any or all of the illustrated elements, processes and devices.

Figure 8A:
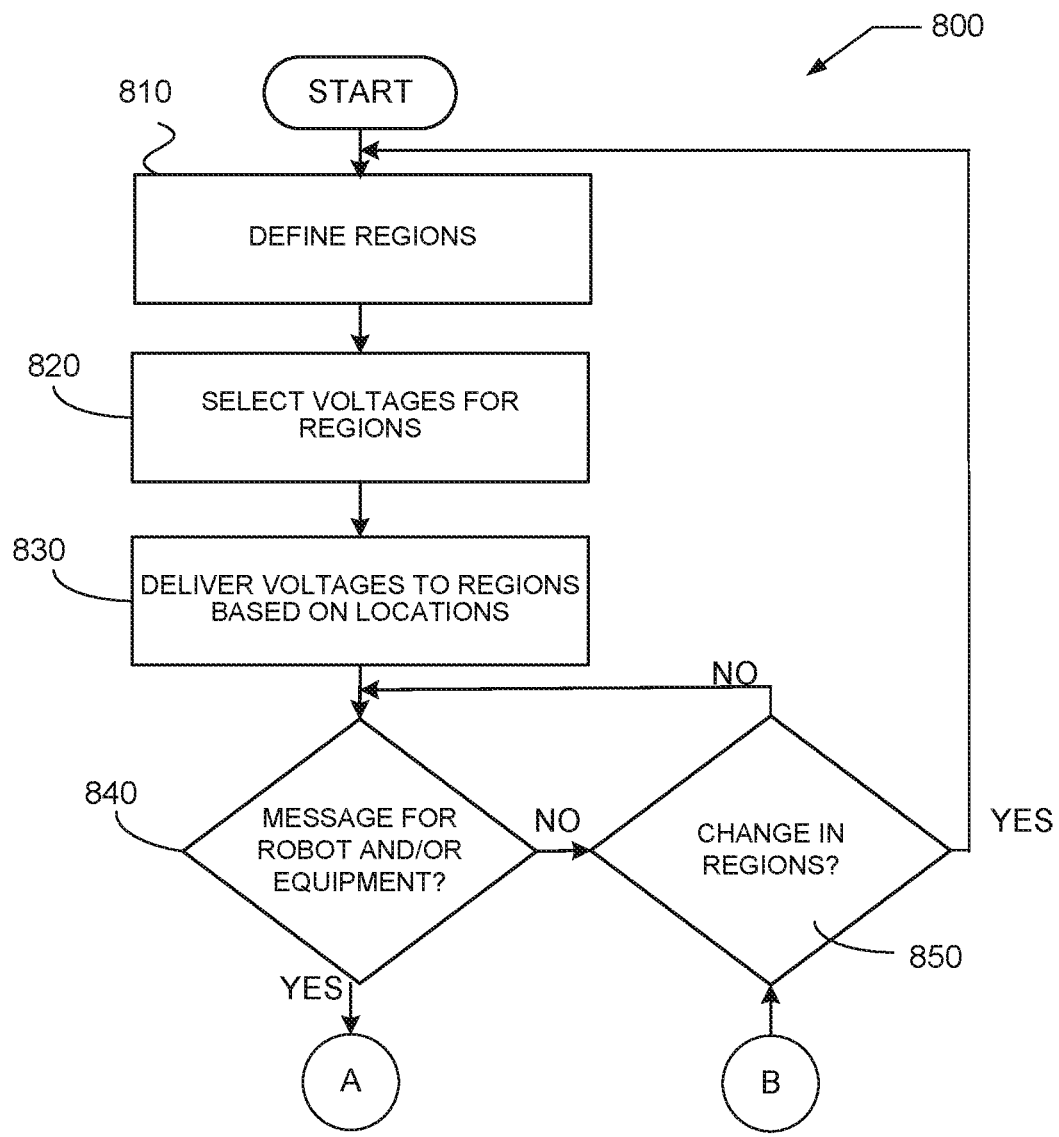
FIGS. 8A-8B present a flowchart representation of computer-executable instructions, which may be executed to implement the example robot controller of FIGS. 2 and/or 6.
Figure 8B:
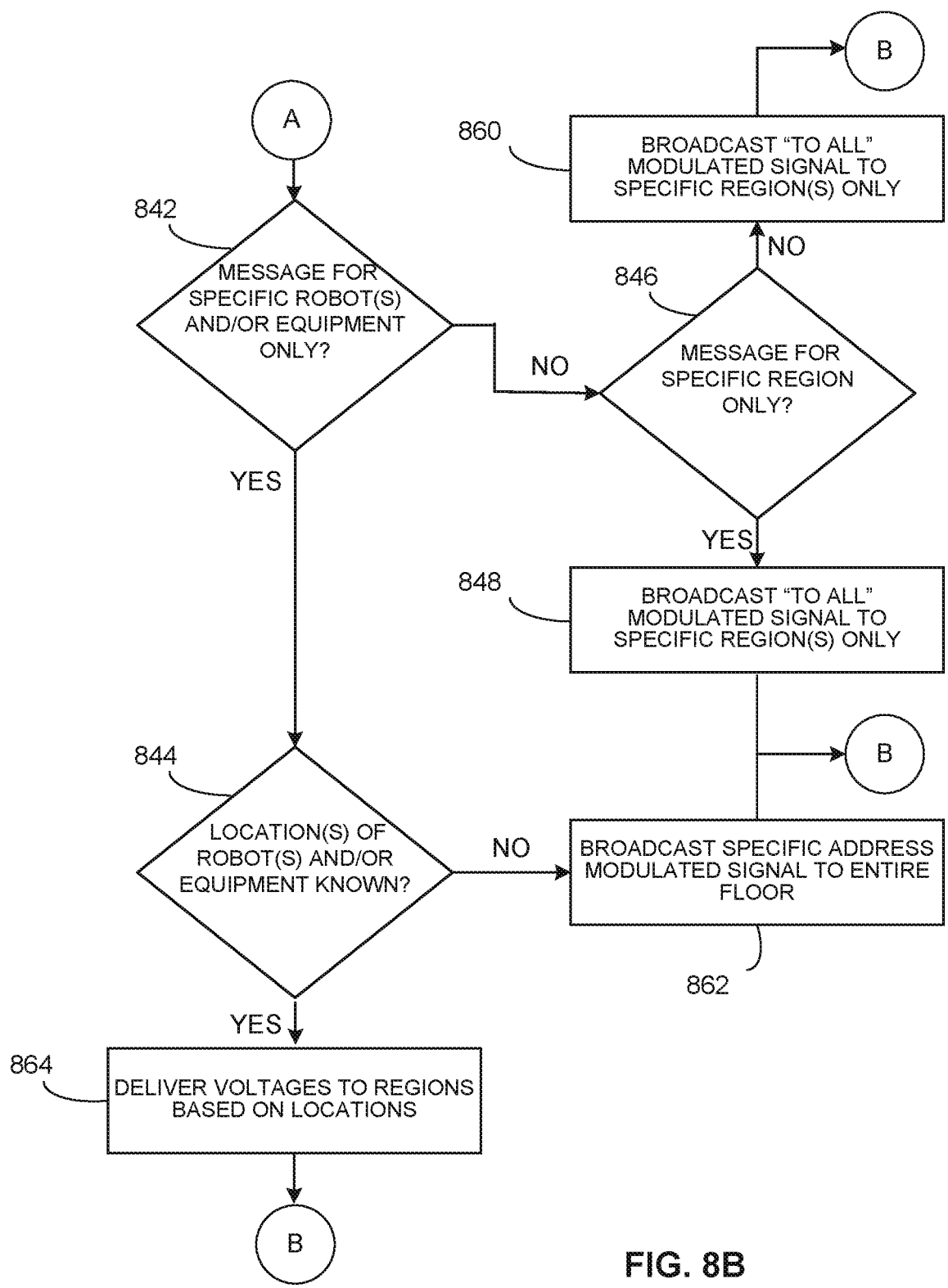

An example flowchart representing example machine readable instructions for implementing the example robot controller 270 of FIG. 6 is shown in FIGS. 8A-8B. In the example of FIGS. 8A-8B, the machine-readable instructions are a program for execution by one or more processors, such as the processor 260 shown in FIG. 2 and in the example processor platform 1000 discussed below in connection with FIG. 10. The program may be embodied in software stored on a non-transitory computer-readable storage medium such as a CD-ROM, a floppy disk, a hard drive, a digital versatile disk (DVD), a Blu-ray disk, or a memory associated with the processor 260, but the entire program and/or parts thereof could alternatively be executed by a device other than the processor 260 and/or embodied in firmware or dedicated hardware. Further, although the example program is described with reference to the flowchart illustrated in FIGS. 8A-8B, many other methods of implementing the example robot controller 270 may alternatively be used. For example, the order of execution of the blocks in FIGS. 8A-8B may be changed, and/or some of the blocks described may be changed, eliminated, and/or combined.

As mentioned above, the example machine readable instructions shown in FIGS. 8A-8B for implementing the example robot controller 270 disclosed herein, may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used (e.g., as the transition term in a preamble of a claim), it is open-ended in the same manner as the term "comprising" is open ended.

The example program of FIGS. 8A-8B begins at block 810 where the example region definer 610 identifies different regions of a conductive floor 140 (e.g., a ramp, an exit, a quiet zone, an elevated area, a do not enter area, boundaries, etc.). In some examples, the different regions of the conductive floor 140 are defined by the example region definer 610 the location data 245 and/or schedule data 255 of FIG. 1. At block 820, the voltage selector 620 selects voltages for the different regions of the conductive floor 140 identified by the region definer 630. In some examples, the voltages are selected based on predefined operations or behaviors associated with the defined area (e.g., stop and turn around command may be associated on the boundary or do not enter region(s)) by referring predefined operations and/or behaviors mapped to region definitions in the power control data 240 accessible to the server 195, the voltage selector 620 can identify the corresponding commands specifying such operations and/or behaviors. Additionally or alternatively, the voltage defined may reference a program specifying operations and/or behaviors to be carried out by the robot(s) and/or other equipment on the corresponding floor plan (e.g., the floor of FIG. 6) to achieve a specific end goal. While typically such end goal is achieved by programming located in the robot(s) 110 and/or other equipment and, then autonomously executed by the robot(s) 110 and/or other equipment without reference to information from the conductive floor 140, if certain operations/behavior are always to be done in certain regions (at least at certain times) the voltage selector 620 may identify voltages to apply to enforce those operations/behaviors. In any event, once the desired command(s) for the region(s) are identified, the voltage selector 620 may access a LUX in the power control data 240 to identify the voltages to be applied to the region by the example voltage selector 620.

At block 830, the voltage selector 620 instructs the multiplexor 225 to deliver cause the example power delivery circuit 120, to deliver the corresponding voltages to the correct substrate of the example conductors 402, 404 so that each region of the conductive floor 140 exhibits the voltage to cause the desired operation(s) and/or behaviors in these regions.

For example, the example power delivery circuit 120, responsive to the example voltage selector 620, causes the example conductors 402, 404 of a first region of the conductive floor 140 to have a first selected voltage and causes the example conductors 402, 404 of a second region of the conductive floor 140 to have a second selected voltage. In some examples, the region definer and voltage selector redefine the region(s) and/or voltage(s) as explained below for example, the conductors 402, 404 of a first region of the conductive floor 140 may have a first selected voltage at a first time and a second selected voltage at a second time different than the first time (e.g., day shift and night shift are different times).

At block 840, the messenger 640 determines whether any message is to be delivered to a robot 110 and/or other equipment located on the conductive floor 140. If a result of block 840 is "YES," the messenger 640 determines whether the message is intended or only specific robot(s) and/or other equipment (block 842). If yes, control advances to block 844. If instead, the message is a "broadcast to all" message intended for all robot(s) and/or equipment on the floor (or at least not specifically addressed to a robot or other equipment), control advance from block 842 to block 846.

At block 846, the messenger 640 determines whether the message is intended for a specific region only. If the message is intended for one or more specific region(s) only (block 846), control advance to block 848 where the modulator 650 cooperates with the multiplexor to modulate the "to all" modulated signal onto the voltages in the specific region(s). Control then return to block 850. If, on the other hand, the message is not intended for only one or more specific region(s) (block 846), control advance to block 860 where the modulator 650 cooperates with the multiplexor to modulate the "to all" modulated signal onto the voltages of the entire conductive floor 140.

At block 844, the messenger 640 determines whether the robot locator 630 has identified the location(s) of the specific robot(s) and/or other equipment which are intended to receive the message. If the location(s) are unknown (block 844), the modulator 650 cooperates with the multiplexor to modulate the "specifically addressed" modulated signal onto the voltages of the entire conductive floor 140 (block 862). Control then returns to block 850.

If, on the other hand, at block 844, the messenger 640 determines the robot locator 630 has identified the location(s) of the specific robot(s) and/or other equipment which are intended to receive the message, control advance to block 864. At block 864, the modulator 650 cooperates with the multiplexor to modulate the "specifically addressed" modulated signal onto the voltages in the region(s) corresponding to the known locations of the specifically addressed robot(s) and/or other equipment. Control then return to block 850.

At block 850, the region definer 610 determines if a change in regions has occurred. For example, the schedule data may specify that the regions of the floor are to be re-evaluated and/or re-set at certain times. For instance, it may be desirable to enforce different operation modes and/or behaviors at certain time(s) of the day (e.g., faster activity at night when there is less human traffic, slower activity during the day when more humans are around), day(s) of the week (e.g., faster activity on weekend when there is less human traffic, slower activity during the weekdays when more humans are around), week(s) of the month (e.g., faster activity on holiday weeks when there is less human traffic, slower activity during the normal (non-holiday) weeks when more humans are around), and/or month(s) of the year (e.g., less activity/heat generation in the summer, more activity/ heat generation in colder temperature months). If it is time to re-evaluate and/or change the region definitions and/or the voltage to region assignments (block 850), control returns to block 810 where the process continues as explained above.

In some examples, messaging via the modulated signal may include an instruction for a robot 110 to execute a particular function. To illustrate, an example courier or delivery robot 110 configured to move payloads (e.g., inventory, Work in Progress (WIP), etc.) within a semiconductor fabrication facility (e.g., a cleanroom), an example first message to the robot 110 may be to dispense a first payload to a first work station and an example second message may be to dispense a second payload to a second work station. In another example, for an example industrial cleaning robot, an example first message may be to perform a first cleaning operation and an example second message may be to perform a second cleaning operation. In a further example, a specifically addressed modulated signal may include an instruction to a specific robot to reposition one or more components (e.g., arms, torso, etc.) of the robot to shift a center of gravity of the robot (e.g., downwardly, in a direction of forward movement when moving up or climbing an incline or stairs, in a direction away from a direction of movement when moving down or descending along an incline or stairs, etc.) to enhance stability of the robot as it moves along an obstacle (e.g., a ramp, stairs, etc.). In some examples, the messaging from the example power supply modulator 600 is informed by a location of a robot and/or a direction of travel of an ambulatory robot. For example, over a same obstacle (e.g., ramp 615), a first message is broadcast to the robot traveling in a first direction along the obstacle (e.g., going up a ramp) and a second message is broadcast to the robot traveling in a second direction along the obstacle (e.g., going down a ramp).

Figure 9:
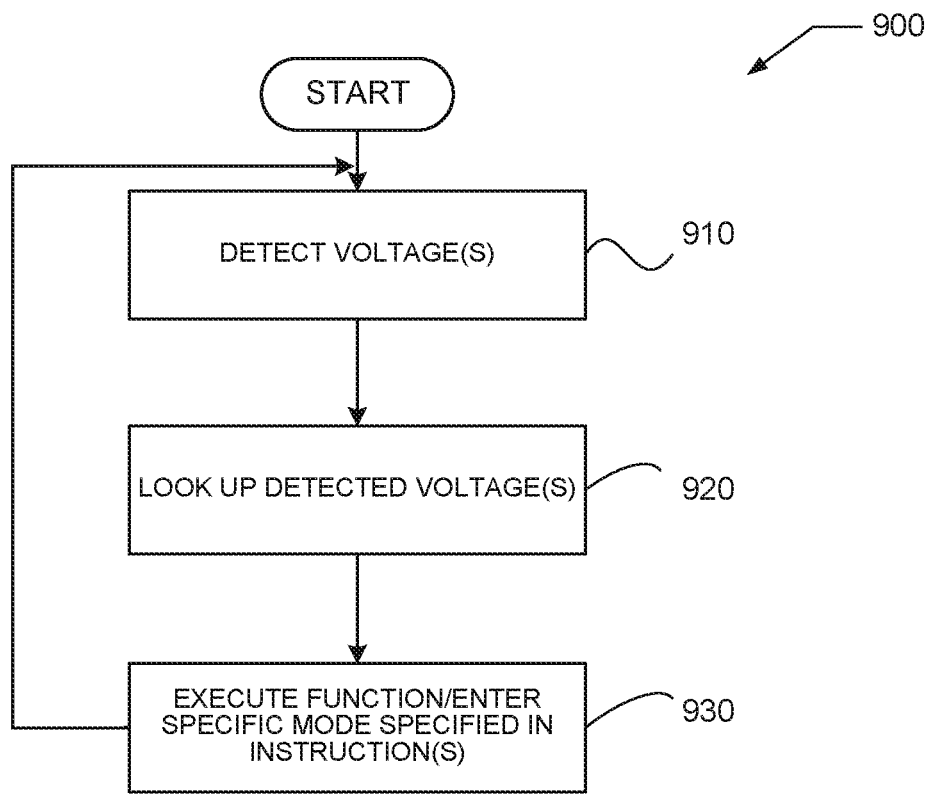
FIG. 9 is a flowchart representation of computer-executable instructions, which may be executed to implement the example robot of FIGS. 1 and/or 3.

FIG. 9 is a flowchart representation of computer-executable instructions, which may be executed by a processor of a robot and/or other equipment. At block 910, the processor of the robot or other equipment detects the voltage(s) present in the power it is receiving via the conductive floor 140. The power may include only the power delivery voltage. Alternatively, a signal may be modulated onto the power delivery voltage as explained above.

At block 920, the processor of the robot or other equipment looks up the detected voltage(s) in a look up table to interpret the same. If the voltage(s) are mapped to one or more command(s), the processor of the robot or other equipment executes the function(s) and/or enters the operating mode(s) specified by the command. Control then returns to block 910.

Figure 10:
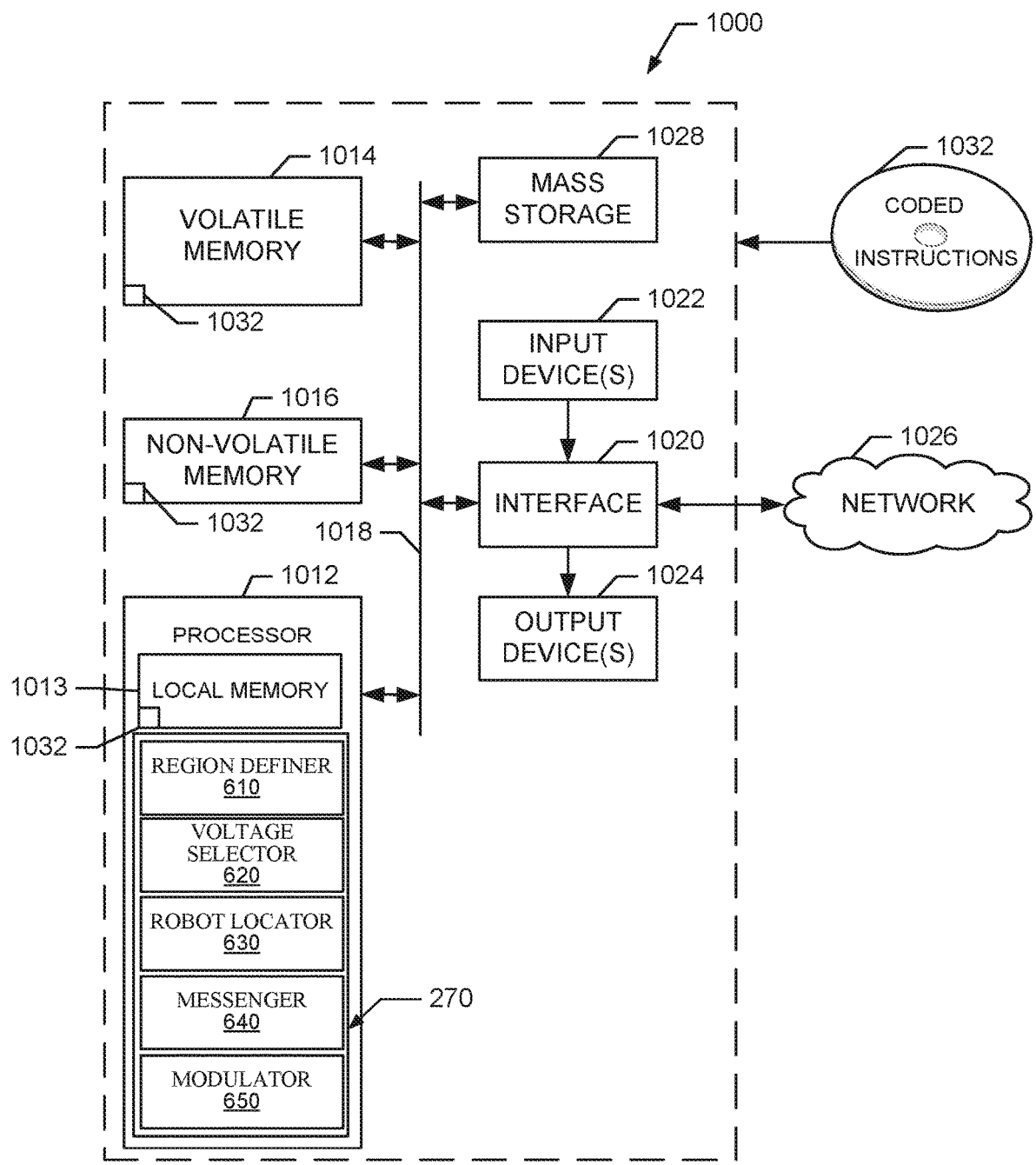
FIG. 10 is a block diagram illustrating an example processor platform which may execute the instructions of FIGS. 8A-8B to implement the example server of FIGS. 1, 2 and/or 6.

FIG. 10 is a block diagram of an example processor platform 1000 capable of executing the executable instructions of FIGS. 8A-8B or other instructions consistent with the teachings herein to implement the example robot controller 270 of FIG. 6. The processor platform 1000 may be implemented by the server 195 of FIGS. 1 and 2 and/or by a desktop computer, a laptop computer, a mobile device (e.g., a tablet computer, such as an iPad™), or any other type of computing device.

The example processor platform 1000 of FIG. 10 includes an example processor 1012. The example processor 1012 of the illustrated example is a semiconductor based hardware device. For example, the example processor 1012 can be implemented by one or more integrated circuits, logic circuits, microprocessors or controllers from any desired family or manufacturer.

The example processor 1012 of the illustrated example includes or is operatively associated with an example local memory 1013 (e.g., an on chip cache). The example processor 1012 may, for example, execute the instructions of FIGS. 8A-8B to implement the example region definer 610, the example voltage selector 620, the example robot locator 630, the example messenger 640 and/or the example modulator 650. The processor 1012 of the illustrated example is in communication, via an example bus 1018, with a main memory including an example local memory 1013, an example volatile memory 1014 and an example non-volatile memory 1016. The example volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The example non-volatile memory 1016 may be implemented by flash memory and/or any other desired type of memory device. Access to the main memory 1014, 1016 may be controlled by a memory controller.

The example processor platform 1000 of the illustrated example also includes an example interface circuit 1020. The example interface circuit 1020 may be implemented by any type of interface standard, such as an Ethernet interface, a universal serial bus (USB), and/or a PCI express interface.

In the illustrated example, one or more example input devices 1022 are connected to the example interface circuit 1020 via example bus 1018. The example input device(s) 1022 permit(s) a user to enter data and commands into the example processor 1012. The input device(s) can be implemented by, for example, an audio sensor, a microphone, a camera (still or video), a keyboard, a keypad, a button, a button panel, a mouse, a touchscreen, a track-pad, a trackball, isopoint and/or a voice recognition system.

One or more example output devices 1024 are also connected to the example interface circuit 1020 of the illustrated example. The example output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer, speakers, etc.). The example interface circuit 1020 of the illustrated example, thus, typically includes a graphics driver card, a graphics driver chip or a graphics driver processor.

The example interface circuit 1020 of the illustrated example also includes a communication device such as a transmitter, a receiver, a transceiver, a modem and/or network interface card to facilitate exchange of data with external machines (e.g., computing devices of any kind) via an example network 1026 (e.g., an Ethernet connection, a digital subscriber line (DSL), a telephone line, coaxial cable, a cellular telephone system, etc.).

The example processor platform 1000 of the illustrated example also includes one or more example mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The example coded instructions 1032 represented generally in FIGS. 8A-8B, or in any other methods and processes disclosed herein, may be stored in the mass storage device 1028, in the example volatile memory 1014, in the example non-volatile memory 1016, and/or on a removable tangible computer readable storage medium such as a CD or DVD.

Example 1 is a conductive floor to power a robot on the floor including a plurality of stationary conductors positioned in a pattern and a power delivery circuit to cause adjacent ones of the conductors to have different electrical potentials, the adjacent ones of the conductors to form a circuit to deliver power to the robot via contacts formed in a bottom surface of the robot.

Example 2 includes the conductive floor as defined in example 1, wherein the robot is ambulatory and the contacts of the robot are disposed in contact surfaces that move to propel the robot across the floor.

Example 3 includes the conductive floor as defined in example 1 or 2, wherein the power delivery circuit is to cause a first set of the conductors in a first region of the floor to exhibit a first voltage and a second set of the conductors in a second region of the floor to exhibit a second voltage different than the first voltage, the first and second regions not overlapping.

Example 4 includes the conductive floor as defined in example 1, 2 or 3, wherein the first voltage in the first region is higher than the second voltage to provide increased power to the robot in the first region.

Example 5 includes the conductive floor as defined in any of examples 1-4, wherein the first region is adjacent the second region, and the first voltage is selected to define a boundary to be honored by the robot.

Example 6 includes the conductive floor as defined in any of examples 1-5 and further includes a modulator to cause a modulated signal to be conducted via a first one of the conductors to convey data to the robot.

Example 7 includes the conductive floor as defined in any of examples 1-6, wherein the data conveyed via the modulated signal includes an instruction to the robot to at least one of activate a function, deactivate a function, change a direction of travel, or change an operational state.

Example 8 includes the conductive floor as defined in any of examples 1-7 and further includes a modulator to cause a modulated signal to be conducted within the first region, the modulated signal to not be conducted in the second region, the modulated signal to denote a boundary between the first and second regions.

Example 9 includes the conductive floor as defined in any of examples 1-8, wherein the conductors are at least portions of slats defining a surface of the floor.

Example 10 includes the conductive floor as defined in any of examples 1-9, wherein the conductors are an array of power nodes and ground nodes.

Example 11 includes the conductive floor as defined in any of examples 1-10, wherein the contacts are located on a tire or wheel of the robot.

Example 12 includes the conductive floor as defined in any of examples 1-11, wherein the contacts are an array of power nodes and ground nodes positioned to rotate with the wheel.

Example 13 includes the conductive floor as defined in any of examples 1-12, wherein the contacts are conductive treads moved by the wheel.

Example 14 includes the conductive floor as defined in any of examples 1-13, wherein the robot is non-ambulatory and can be powered from any position on the floor without plugging in a cord.

Example 15 includes the conductive floor as defined in any of examples 1-14, wherein non-ambulatory equipment can be placed into circuit with power by placing the equipment on the floor and without plugging a cord into a source of power separate from the floor.

Example 16 includes the conductive floor as defined in any of examples 1-15, wherein the power delivery circuit is to cause a first set of the conductors in a first region of the floor to exhibit a first voltage at a first time and to cause the first set of the conductors in the first region of the floor to exhibit a second voltage at a second time, the first voltage different than the second voltage.

Example 17 includes the conductive floor as defined in any of examples 1-16, wherein the first voltage is to cause at least a first robot to operate in a first operational state and the second voltage is to cause the at least the first robot to operate in a second operational state different from the first state.

Example 18 is a robot including a housing, a processor carried by the housing, a tread to move the housing, a motor to drive the tread and contacts disposed along the tread to obtain power for the motor by forming circuits with conductors positioned on a surface along which the tread moves.

Example 19 includes the robot as defined in example 18, wherein the robot does not carry a portable power supply to drive the motor.

Example 20 includes the robot as defined in example 18 or 19, wherein the contacts are a plurality of discrete contacts.

Example 21 includes the robot as defined in example 18, 19 or 20, wherein the conductors include a plurality of conductive bands carried by the tread.

Example 22 includes the robot as defined in any of examples 18-21, wherein the tread is operatively coupled to a tire or wheel.

Example 23 includes the robot as defined in any of examples 18-22, wherein the robot is to implement a first instruction responsive to a first modulated signal received via the contacts disposed along the tread, and wherein the robot is to implement a second instruction responsive to a second modulated signal received via the contacts disposed along the tread.

Example 24 includes the robot as defined in any of examples 18-23, wherein the first modulated signal or the second modulated signal causes the robot to at least one of activate a function, deactivate a function, change a direction of travel, operate under a constraint or change a state.

Example 25 includes the robot as defined in any of examples 18-24, wherein the constraint includes a speed constraint or a movement constraint.

Example 26 includes the robot as defined in any of examples 18-25, wherein a maximum lateral dimension of the contacts disposed along the tread is less than a spacing between the conductors positioned on the surface along which the tread moves.

Example 27 includes the robot as defined in any of examples 18-26, further including a battery which is smaller than the expected power requirements needed for the robot to complete at least some designated tasks.

Example 28 includes the robot as defined in example 27, wherein the power provided by the floor is only used by the robot to complete the at least some designated tasks.

Example 29 is a method of delivering power to a robot including causing adjacent ones of stationary conductors forming at least a part of a floor to have different electrical potentials and delivering power to the robot by forming a conductive path between at least some of the adjacent ones of the conductors via contacts formed in a bottom surface of the robot.

Example 30 includes the method as defined in example 29, further including powering movement of the robot during transit of the robot over the at least the part of the floor via the conductors.

Example 31 includes the method as defined in example 29 or 30, further including at least one of activating a function of the robot by transmitting a first modulated signal via the floor, deactivating a function of the robot by transmitting a second modulated signal via the floor, changing a direction of movement of the robot by transmitting a third modulated signal via the floor, or changing a state of a system of the robot by transmitting a fourth modulated signal via the floor.

Example 32 includes the method as defined in any of examples 29-31, further including causing a first set of the conductors in a first region of the floor to have a first power delivery voltage and causing a second set of the conductors in a second region of the floor to have a second power delivery voltage different than the first voltage, the first and second regions not overlapping.

Example 33 includes the method as defined in any of examples 29-32, further including causing a first set of the conductors in a substantially flat region of the floor to have a first voltage and causing a second set of the conductors in an inclined region of the floor to have a second voltage different than the first voltage, the second voltage being higher than the first voltage, to provide increased power to the robot for moving upwardly along the inclined region.

Example 34 includes the method as defined in any of examples 29-33, further including causing a first set of the conductors in a first region of the floor to have a first voltage at a first time to provide a first electric potential difference between adjacent conductors and causing the first set of the conductors in the first region of the floor to have a second voltage at a second time to provide a second electric potential difference between adjacent conductors, the second voltage being higher than the first voltage.

Example 35 is a robot controller including a region definer to identify two or more regions of a conductive floor and a voltage selector to identify two or more voltages to be used to deliver power in respective ones of the two or more regions of the floor, at least one of the voltages selected to cause a machine drawing power form the floor to at least one of perform a function, enter an operation mode, and take an action.

Example 36 includes the robot controller as defined in example 35, wherein the machine is at least one of an ambulatory robot, a non-ambulatory robot and stationary equipment.

Example 37 includes the robot controller as defined in examples 35 or 36 and further includes a locator to identify a location of the machine on the conductive floor.

Example 38 includes the robot controller as defined in any of the examples of 35-37 and further includes a messenger to develop a message to send to the machine via the conductive floor.

Example 39 includes the robot controller as defined in any of examples 35-38 wherein the machine is a first machine, the message is addressed to the first machine, and the message is to be ignored by a second machine to which the message is not addressed.

Example 40 includes the robot controller as defined in any of examples 35-39, wherein the message is broadcast throughout the floor.

Example 41 includes the robot controller as defined in any of examples 35-40, wherein the message is broadcast to a subset of the regions.

Example 42 includes the robot controller as defined in any of examples 35-41, wherein the message is not addressed to a specific machine.

Example 43 includes the robot controller as defined in any of examples 35-42, wherein the message is broadcast throughout the floor.

Example 44 includes the robot controller as defined in any of examples 35-43, wherein the message is broadcast to a subset of the regions.

Example 45 includes the robot controller as defined in any of examples 35-44, further including a modulator to modulate the message onto at least one of the at least two voltages.

Example 46 is method of controlling a robot, the method including identifying, by executing an instruction with a processor, two or more regions of a conductive floor and identifying, by executing an instruction with the processor, two or more voltages to be used to deliver power in respective ones of the two or more regions of the floor, at least one of the voltages selected to cause a machine drawing power form the floor to at least one of perform a function, enter an operation mode, and take an action. The method also includes delivering the two or more voltages to the respective ones of the two or more regions to power the machine.

Example 47 includes the method as defined in example 46 and further includes powering another machine drawing power from the floor in another one of the two or more regions via another of the two or more voltages delivered to cause the another machine to at least one of perform a function, enter an operation mode, and take an action.

Example 48 is non-transitory machine readable medium including executable instructions that, when executed, cause at least one processor to at least identify two or more regions of a conductive floor, identify two or more voltages to be used to deliver power in respective ones of the two or more regions of the floor, at least one of the voltages selected to cause a machine drawing power form the floor to at least one of perform a function, enter an operation mode, and take an action, and deliver the two or more voltages to the respective ones of the two or more regions to power the machine.

Example 49 includes the non-transitory machine readable medium of example 48 including executable instructions that, when executed, cause at least one processor to power another machine drawing power from the floor in another one of the two or more regions via another of the two or more voltages delivered to cause the another machine to at least one of perform a function, enter an operation mode, and take an action.

Example 50 is a conductive floor to power a robot on the floor, the floor including a plurality of stationary conductive means positioned in a pattern and a power delivery means to cause adjacent ones of the conductive means to have different electrical potentials, the adjacent ones of the conductive means to form a circuit means to deliver power to the robot via contacts formed in a bottom surface of the robot.

Example 51 includes the conductive floor as defined in example 50, wherein the robot is ambulatory and the contacts of the robot are disposed in contact surfaces that move to propel the robot across the floor.

Example 52 includes the conductive floor as defined in any of examples 50-51, wherein the power delivery means is to cause a first set of the conductive means in a first region of the floor to exhibit a first voltage and a second set of the conductive means in a second region of the floor to exhibit a second voltage different than the first voltage, the first and second regions not overlapping.

Example 53 includes the conductive floor as defined in any of examples 50-52, wherein the first voltage in the first region is higher than the second voltage to provide increased power to the robot in the first region.

Example 54 includes the conductive floor as defined in any of examples 50-53, wherein the first region is adjacent the second region, and the first voltage is selected to define a boundary to be honored by the robot.

Example 55 includes the conductive floor as defined in any of examples 50-54, further including a modulator to cause a modulated signal to be conducted via a first one of the conductive means to convey data to the robot.

Example 56 includes the conductive floor as defined in any of examples 50-55, wherein the data conveyed via the modulated signal includes an instruction to the robot to at least one of activate a function, deactivate a function, change a direction of travel, or change an operational state.

Example 57 is a robot including a housing, a processor means carried by the housing, a tread means to move the housing, a motor means to drive the tread means and contact means disposed along the tread means to obtain power for the motor means by forming circuit means with conductor means positioned on a surface along which the tread means moves.

Example 58 includes the robot as defined in examples 57, wherein the robot does not carry a portable power supply means to drive the motor means.

Example 59 includes the robot as defined in examples 57-58, wherein the contact means are a plurality of discrete contacts.

Example 60 includes the robot as defined in any of examples 57-59, wherein the conductor means include a plurality of conductive bands carried by the tread.

Example 61 includes the robot as defined in any of examples 57-60, wherein the tread means is operatively coupled to a tire or wheel.

Example 62 is a robot controller, including a region defining means to identify two or more regions of a conductive floor and a voltage selector means to identify two or more voltages to be used to deliver power in respective ones of the two or more regions of the floor, at least one of the voltages selected to cause a machine drawing power form the floor to at least one of perform a function, enter an operation mode, and take an action.

Example 63 includes the robot controller as defined in example 62, wherein the machine is at least one of an ambulatory robot, a non-ambulatory robot and stationary equipment.

Example 64 includes the robot controller as defined in any of examples 62-63, further including a locator means to identify a location of the machine on the conductive floor.

Example 65 includes the robot controller as defined in any of examples 62-64, further including a messenger means to develop a message to send to the machine via the conductive floor.

Example 66 is machine-readable storage including machine-readable instructions, when executed, to implement a method or realize an apparatus as set forth in any preceding example.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A robot comprising:
   a housing;
   processor circuitry carried by the housing;
   a tread to move the housing; and
   contacts disposed along the tread, the contacts to form a circuit with a plurality of stationary conductors positioned in a pattern on a conductive floor to deliver at least one of power, data, or an executable instruction to the robot, at least one of (a) the conductors being bands and the contacts being point contacts, or (b) the conductors being point contacts and the contacts being bands.

2. The robot of claim 1, further including a tire, a ball, or a wheel, the tread disposed on the tire, the ball, or the wheel.

3. The robot of claim 2, further including a drive system to control rotation of the tire, the ball, or the wheel, the power delivered via the circuit to be provided to the drive system to cause the robot to move.

4. The robot of claim 1, wherein the contacts are point contacts, the tread disposed between a first one of the point contacts and a second one of the point contacts.

5. The robot of claim 1, wherein the executable instruction is conveyed via a modulated signal received via the contacts.

6. The robot of claim 5, wherein the robot is to at least one of activate a first function, deactivate a second function, change a direction of travel, or change an operational state in response to the executable instruction.

7. The robot of claim 1, further including memory, the memory to store the data received via the circuit, the data including a schedule of first and second functions to be performed by the robot, the processor circuitry to:
   instruct the robot to perform the first function at a first time based on the schedule; and
   instruct the robot to perform the second function at a second time based on the schedule.

8. A robot comprising:
   a housing;
   a motor;
   a tread to move the housing; and
   contacts disposed along the tread to obtain power for the motor by forming one or more circuits with conductors positioned on a surface on which the tread moves, the one or more circuits including a first circuit and a second circuit,
   the contacts to form the first circuit with the conductors when the robot is positioned at a first region of the surface, the robot to receive a first amount of power when the robot is positioned at the first region via the first circuit; and
   the contacts to form the second circuit with the conductors when the robot is positioned at a second region of the surface, the robot to receive a second amount of power when the robot is positioned at the second region of the surface, the second amount of power greater than the first amount of power.

9. The robot of claim 8, wherein the robot is to perform a first function when the robot is positioned at the first region of the surface and to perform a second function when the robot is positioned at the second region of the surface, the robot to consume an increased amount of power when performing the second function relative to the first function.

10. A robot comprising:
    a housing;
    a motor;
    a tread to move the housing; and
    contacts disposed along the tread to obtain power for the motor by forming one or more circuits with conductors positioned on a surface on which the tread moves, wherein at least one of (a) the conductors are bands and the contacts are point contacts or (b) the conductors are point contacts and the contacts are bands.

11. The robot of claim 10, wherein the contacts are an array of power nodes and ground nodes configured to move with the tread.

12. A robot comprising:
a housing;
a motor;
a tread to move the housing; and
contacts disposed along the tread to obtain power for the motor by forming one or more circuits with conductors positioned on a surface on which the tread moves, a width of the respective contacts disposed along the tread less than a width of a spacing between two of the conductors positioned on the surface.

13. A robot comprising:
a housing;
a tread carried by the housing;
one or more contacts carried by the tread;
memory; and
a processor to:
  detect a first voltage at a first region of a floor via one or more circuits including the one or more contacts and one or more first conductors disposed on the floor in the first region;
  instruct the robot to perform a first operation in response to the detection of the first voltage using power received from the first voltage;
  detect a second voltage at a second region of the floor via one or more circuits including the one or more contacts and one or more second conductors disposed on the floor in the second region; and
  instruct the robot to perform a second operation in response to the detection of the second voltage using power received from the second voltage.

14. The robot of claim 13, wherein the first voltage is higher than the second voltage and the robot is to consume a greater amount of power when performing the first operation than when performing the second operation.

15. The robot of claim 14, wherein the first region is an inclined region and the robot is to move upwardly along the inclined region when performing the first operation.

16. The robot of claim 14, wherein the robot is to access power from a battery of the robot when performing the first operation.

17. The robot of claim 13, wherein the processor is to:
  instruct the robot to perform the first operation based on a first speed constraint or a first movement constraint for the robot in response to a first modulated signal received via the one or more contacts when the robot is in the first region; and
  instruct the robot to perform the second operation based on a second speed constraint or a second movement constraint for the robot in response to the second voltage in response to a second modulated signal received via the one or more contacts when the robot is in the second region.

18. The robot of claim 13, wherein the processor is to instruct the robot to move from the first region of the floor to the second region of the floor.

19. The robot of claim 13, wherein the processor is to determine the first operation based on a modulated signal transmitted to the robot via the first voltage.

\* \* \* \* \*